US 7,539,587 B2

(12) United States Patent
Frankel et al.

(10) Patent No.: US 7,539,587 B2
(45) Date of Patent: May 26, 2009

(54) RATE-BASED SENSORS FOR ADVANCED REAL-TIME ANALYSIS AND DIAGNOSTICS

(75) Inventors: Jay I. Frankel, Knoxville, TN (US); Majid Keyhani, Knoxville, TN (US); Rao V. Arimilli, Knoxville, TN (US); Jie (Jayne) Wu, Knoxville, TN (US)

(73) Assignee: University of Tennessee Research Foundation, Knoxville, TN (US)

(*) Notice: Subject to any disclaimer, the term of this patent is extended or adjusted under 35 U.S.C. 154(b) by 20 days.

(21) Appl. No.: 11/534,412

(22) Filed: Sep. 22, 2006

(65) Prior Publication Data

US 2007/0252633 A1     Nov. 1, 2007

Related U.S. Application Data

(60) Provisional application No. 60/719,535, filed on Sep. 22, 2005.

(51) Int. Cl.
*G06G 7/18* (2006.01)

(52) U.S. Cl. .............................. 702/85; 702/57; 702/60; 702/64; 702/182; 374/30; 374/43; 374/107; 327/335

(58) Field of Classification Search ................... 702/85, 702/57, 60, 64, 182; 73/579, 204.25, 204.19, 73/204.16, 204.17; 374/30, 43, 107; 327/335
See application file for complete search history.

(56) References Cited

U.S. PATENT DOCUMENTS

| 3,633,043 | A | * | 1/1972 | Anthony | 327/129 |
| 3,655,992 | A | * | 4/1972 | Ohno et al. | 307/87 |
| 3,710,062 | A | * | 1/1973 | Peters, Jr. | 219/627 |
| 3,887,781 | A | * | 6/1975 | Peters, Jr. | 219/627 |
| 5,531,115 | A | * | 7/1996 | Erdley | 73/504.02 |
| 5,540,094 | A | * | 7/1996 | Varnham et al. | 73/504.13 |
| 6,763,711 | B1 | * | 7/2004 | Nair et al. | 73/204.15 |
| 7,039,372 | B1 | * | 5/2006 | Sorrells et al. | 455/118 |

* cited by examiner

*Primary Examiner*—Carol S Tsai
(74) *Attorney, Agent, or Firm*—Luedeka, Neely & Graham, P.C.

(57) ABSTRACT

The invention provides a universal rate-based transducer for advancing diagnostic and predictive analyses of low frequency physical phenomena, such as associated with heat and mass transfer, solid and fluid mechanics, pressure and seismic analysis. In many applications, such as in the fire metrology, aerospace, security and defense sectors, rate information is crucial for reaching fast and reliable diagnosis and prediction. In one preferred embodiment, the invention comprises a universal voltage rate sensor interface that accurately recovers the instantaneous heating/cooling rate, dT/dt. Upon appropriate calibration, this sensor interface allows real-time extraction of rates associated with many physical quantities of interest (e.g., temperature, heat flux, concentration, strain, stress, pressure, intensity, etc.).

11 Claims, 20 Drawing Sheets

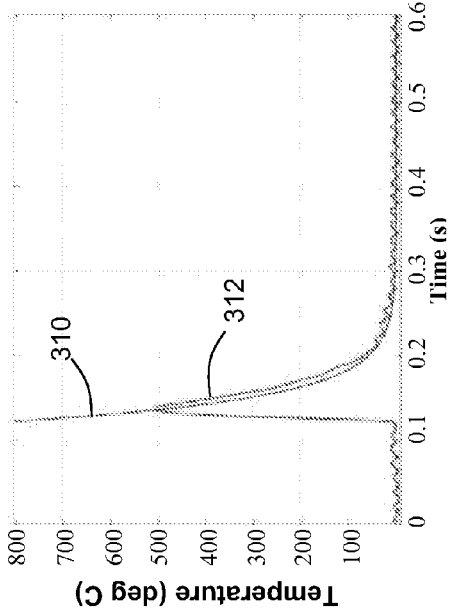
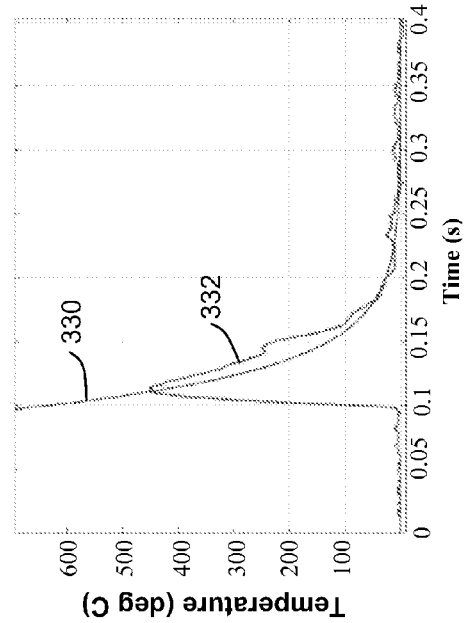
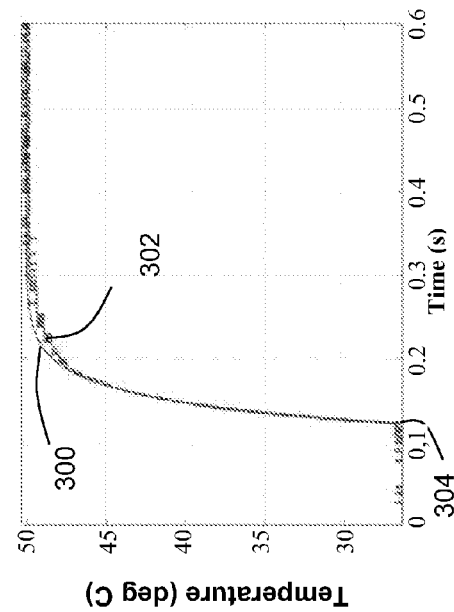
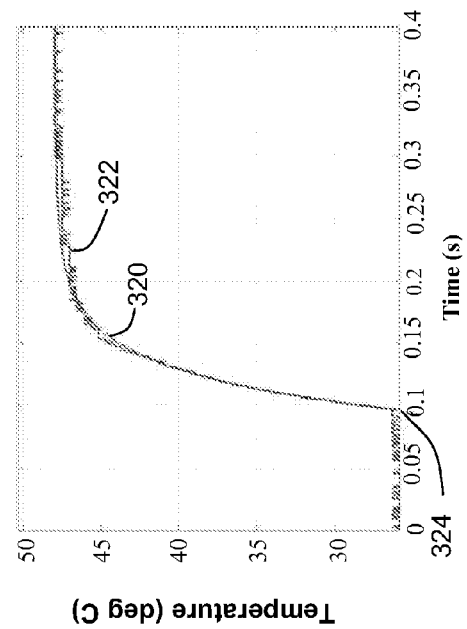

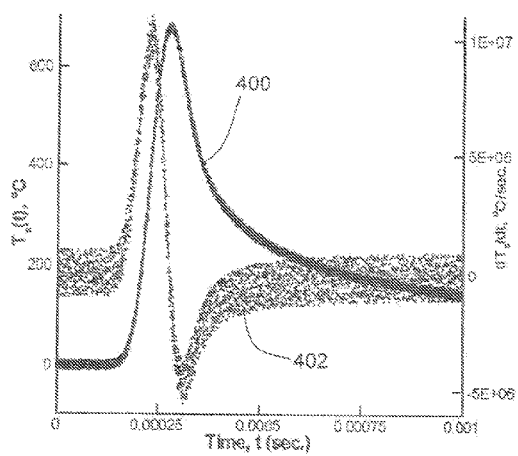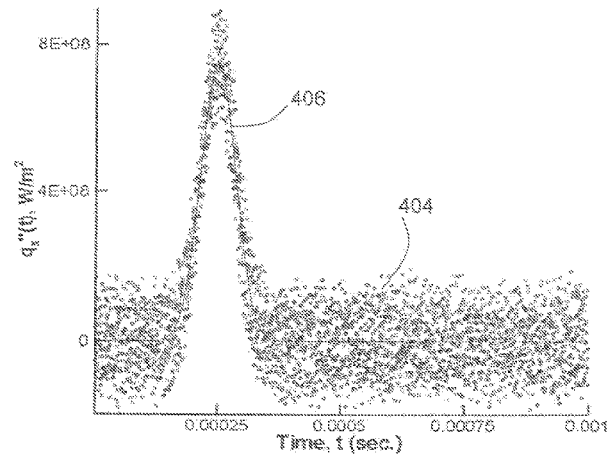
Fig. 11A                                           Fig. 11B

RATE-BASED SENSORS FOR ADVANCED REAL-TIME ANALYSIS AND DIAGNOSTICS

This application claims priority to U.S. provisional patent application Ser. No. 60/719,535 filed Sep. 22, 2005, entitled "Rate-Based Sensors For Advanced Real-Time Analysis And Diagnostics." This U.S. Provisional Patent Application is incorporated by reference in its entirety herein.

FIELD

This invention relates to the field of sensor technology. More particularly, this invention relates to rate measurement sensors.

BACKGROUND

Sensors for accurately measuring physical, chemical and electrical properties of materials and systems are important in science and engineering. Sensors are needed for analysis in heat and mass transfer processes, fluid and solid mechanics, geophysical and seismic sciences, biologics, health care, and the defense and national security arenas. Applications of sensors include system operational health management, inverse analysis, signature discrimination, industrial process control, quality improvement in materials processing and property measurements, and constitutive modeling.

In addition, calculations of the rate of change of physical, chemical and electrical properties are a valuable analytical tool in, for example, evaluation of thermal processes for estimating instantaneous rate of heat flux at a sensor location, or estimation of heat flux at a location different from the sensor location, such as by use of inverse methods. Calculations of thermal rate change are also useful for thermal property measurement and phase transition identification of new materials. Estimations of temperature changes are helpful for better control of thermal processes, remote sensing and advanced tracking based on rate measurements from various optical sensors and so on.

Heat transfer analysis often involves the precise measurement of temperature to obtain heat flux. Heat fluxes and heating/cooling rates are of special concern owing to their involvement in aerospace, defense and nuclear applications, such as re-entry (arc-jet) and direct energy impingement applications. In such applications, a thermocouple is typically mounted on the surface of a plate exposed to a high incoming heat flux. In these applications, data differentiation is typically used for the diagnostic and predictive processes.

Property rate change information may also be used in diagnostic and predictive analyses in solid and fluid mechanics, and pressure and seismic analysis. These analyses are needed in fire metrology, aerospace, heat treatment, defense and homeland security applications. Extracting reliable derivative data is critical to many diagnostic and predictive processes.

Table 1 lists several application areas wherein the availability of voltage rate-based measurement technology has been deficient.

TABLE 1

| Application Area | $0^{th}$-Derivative Primitive Variable | Derivative | 2nd. Derivative | $3^{rd}$. Derivative | Utility |
|---|---|---|---|---|---|
| Mechanical Vibrations | x(t) displacement | $\dfrac{dx}{dt}$ | $\dfrac{d^2x}{dt^2}$ | $\dfrac{d^3x}{dt^3}$ | Mechanical system analysis, modal analysis, source function reconstruction |
| Electrical | V(t) voltage | $I = c\dfrac{dv}{dt}$ | | | Electrical system analysis and responses |
| Thermal | T(t) Temperature q"(t) Heat flux[1] | $\dfrac{dT}{dt}$ * $\dfrac{dq''}{dt}$ * | $\dfrac{d^2T}{dt^2}$ * $\dfrac{d^2q''}{dt^2}$ * | | Surface analysis, embedded analysis (inverse), and property evaluation for health management for real-time analysis. |
| Stress-Strain | ε(t) strain σ(t) stress | $\dfrac{d\epsilon}{dt}$ * $\dfrac{d\sigma}{dt}$ * | | | Constitutive relations development, e.g. creep and stress relaxation $\sigma + \tau = \dfrac{d\sigma}{dt} = E_a\epsilon + (E_a + E_m)\tau\dfrac{d\epsilon}{dt}$ |
| Pressure | P(t) pressure | $\dfrac{dP}{dt}$ * | | | Failure and safety analysis |
| Concentration | C(t) Concentration | $\dfrac{dC}{dt}$ * | | | Concentration gradient for biological sensors |

[1] q"(t) is expressed in Watts/unit area.

Accurate measurements of parameters identified with an asterisk (*) in Table 1 have generally been particularly difficult to acquire. Typically such measurements are calculated by sampling the associated primitive variable over time and then applying various smoothing algorithms to infer the underlying function, and then mathematically differentiating the function with respect to time to estimate the derivative values. One of the principal impediments to this process is electronic noise present in the primitive variable measurements. Off-the-shelf sensors are often perceived to be accurate without a clear understanding of how the high frequency/low amplitude noise affects the outcome of the numerical method.

Even if the noise problem is minimized it would be preferable to acquire measurements of the derivative values in real time. Ideally, real-time rates would be measured rather than estimated, thereby eliminating the numerical differentiation step from data analysis. However, real-time measurement of physical, chemical and electrical property rate change has been an elusive inverse problem. The interplay between the source of data and the implemented numerical scheme is difficult to account for in these inverse studies.

The number of transient studies continues to increase and yet most measurements are taken using steady-state devised sensors. The trend toward investigating transient (e.g., lasers) problems containing several time scales and interactive events are on the increase. However, developing purely mathematical solutions to physical problems requiring stabilization methods often cannot be applied to real-world problems. As a result of these various difficulties, measurements of rate data are generally more inaccurate and less timely than desired. What are needed therefore are improved devices and methods for acquiring time rate measurements of physical, chemical and electrical properties.

SUMMARY

The present invention provides a method embodiment for deriving a rate of change of a parameter $\Phi$ at a time t. The method includes a steps of measuring a voltage rate dV/dt representative of the rate of change of the parameter $\Phi$ at the time t. The method further includes the steps of determining a calibration factor $d\Phi/dV$, and then multiplying the voltage rate dV/dt by the calibration factor $d\Phi/dV$ to derive the rate of change of the parameter $\Phi$ at the time t.

An apparatus embodiment provides an electronic differentiator circuit for differentiating an input voltage $e_1$ having an amplitude p and a frequency f. The electronic differentiator circuit of this embodiment includes an input impedance circuit configured to sense the input voltage, the input impedance circuit comprising an input resistor with resistance $R_1$ and an input capacitor with a capacitance $C_1$ in series with the input resistor. The electronic differentiator circuit of this embodiment further includes an operational amplifier electronically coupled to the input impedance circuit, and a feedback impedance circuit across the operational amplifier, where the feedback impedance circuit includes a feedback resistor with a resistance $R_2$ and a feedback capacitor with a capacitance $C_2$ in parallel with the feedback resistor.

A further apparatus embodiment provides an electronic differentiator circuit for differentiating an input voltage $e_1$ having a signal spectra F(t). The circuit of this embodiment includes a modulation circuit configured to up-convert the signal spectra F(t) by a carrier frequency $\omega_m$ and provide an up-converted signal. The circuit also includes a differentiation circuit configured to differentiate the up-converted signal to provide a first signal component $-F'(t) \cdot e^{j\omega t}$ and a second signal component $-j\omega \cdot F(t) \cdot e^{j\omega t}$. A phase shift circuit configured to shift the up-converted signal 90° at $\omega_m$ is provided to produce a phase-shifted signal $j\omega t \cdot F(t) e^{j\omega t}$. A summing circuit is provided and configured to add the first signal component, the second signal component and the phase-shifted signal to produce a carrier signal $-F'(t) \cdot e^{j\omega t}$. The circuit of this embodiment also includes a demodulation circuit that is configured to extract a time derivative signal $-F'(t)$ from the carrier signal.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIGS. 10A-10D depict examples of measured temperature and temperature rate data for two different configurations of a thermocouple temperature sensor exposed to rapid heating.

FIG. 11A depicts simulated temperature (T) and heating/cooling rate (dT/dt) sensor data contaminated with different levels of white noise;

FIG. 11B depicts predicted heat flux based on T data using the Cook-Felderman method;

DETAILED DESCRIPTION

Basic to all measurement devices are inherent data errors associated with uncertainties and background noise. Turnkey, single-function sensors are designed to provide accuracy and repeatability for a specific, directly measured quantity. However, if the measurements are used to infer other physical quantities, special care must be taken. This is especially evident in the investigation of inverse (ill-posed) problems. Often techniques that rely on mathematical (regularization) methods are employed to overcome the instability associated with ill-posed problems. However, a lack of clarity between analysis and sensor usage has often led to dubious results. Also, in most applications data differentiation is applied within the predictive process. Unfortunately, upon numerical differentiation, the noise that affects all measured physical quantities is dramatically amplified, resulting in an ill-posed inverse problem. Refining the measurement (i.e. increasing the sample density) exacerbates the problem even further, because the increase in accuracy due to finer sampling is wiped out by the cumulative adverse effect of the numerical differentiation. Filtering alone does not cure the problem. Rather, the problem lies in the choice of the data.

Embodiments described herein may reduce or in some instances remove the severe stability problems associated with inverse problems. Preferred embodiments provide a unified low-frequency voltage-rate module that may be used in concert with in-situ sensors to provide the desired rate quantity (e.g., heating/cooling rate, dT/dt; heat flux rate [° C./sec], dq"/dt [W/(cm$^2$-sec)]). For the noted quantities, the rate information typically has a low frequency spectrum, especially when the sensor is attached in an embedded solid medium. The frequency response of the differentiation process will produce an output in proportion to the signal frequency. Therefore, upon direct differentiation, noise and errors prevalent in all measurements will increase relative to the signal and deteriorate the signal/noise ratio, even after painstaking smoothing/filtering.

For example, if data are presented in rate (dT/dt, T=temperature, t=time), the severity of the ill-posed inverse problem may generally be greatly reduced. Thus, a sensor interface is needed that converts the voltage signal from sensor outputs into voltage rate. Since many sensors relate physical quantities linearly to voltage, by adding a voltage-rate sensor interface between the transducer outputs and the information-processing step, the data space in inverse analysis can be changed to quantity rate, e.g. using dT/dt (temperature rate) instead of T (temperature) for heat flux deduction.

Figure 1:
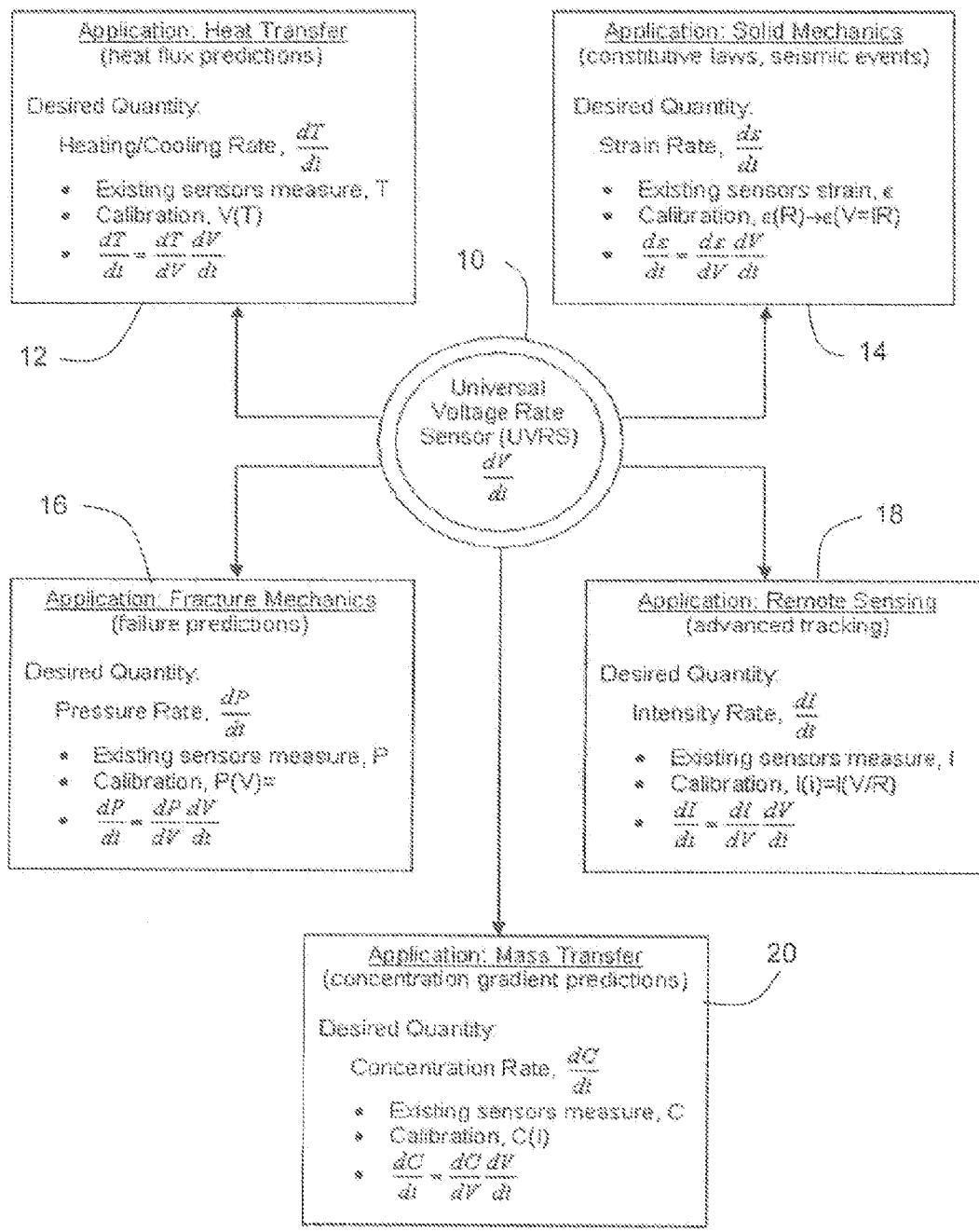
FIG. 1 depicts various applications for a universal voltage rate sensor.

FIG. 1 depicts a broad range of applications in which voltage rate-based measurement technology may be utilized. A universal voltage rate sensor 10 has a first application area 12 for heat transfer measurement, a second application area 14 for solid mechanics measurements, a third application area 16 for fracture mechanics measurements, a fourth application area 18 for remote sensing measurements, and a fifth application area 20 for mass transfer measurements. Various embodiments described in FIG. 1 and elsewhere herein provide a universal rate-based transducer interface for advancing both diagnostic and predictive analyses of low frequency physical phenomena, such as associated with heat and mass transfer, solid and fluid mechanics, pressure and seismic analysis. One preferred embodiment comprises an accurate, universal voltage rate sensor interface that accurately recovers the instantaneous heating/cooling rate, dT/dt. Upon appropriate calibration, this sensor interface allows real-time extraction of rates associated with many physical quantities of interest (e.g., temperature, heat flux, concentration, strain, stress, pressure, intensity, etc.). In many applications, such as in the fire metrology, aerospace, security and defense sectors, rate information is crucial for reaching fast and reliable diagnosis and prediction.

The approach depicted in FIG. 1 provides several advantages. First, since electrical signals are widely used as sensor outputs and in data acquisition, the interface can be readily attached to existing sensors as an add-on. This is in contrast to developing a series of stand-alone sensors for each rate quantity of potential interest based on particular physical principle (e.g., pyroelectric materials for acquiring the heating/cooling rate, dT/dt). Such a voltage-rate interface will allow adaptability and flexibility in the implementation. Second, since the invention uses an existing voltage-producing sensor installed by the user, there are no requirements for new technology to be installed at the sensor site. Third, no additional training will be required by the laboratory technician. The latter two points are considered highly desirable by many users.

Various embodiments may have application in fire metrology, aerospace, energy, geophysical and seismic sciences, health care, engineering sciences, defense, and national security applications. Moreover, the various interface module embodiments provided herein have utility in improving manufacturing processes that require thermal control. As voltage signals are commonly adopted for sensor outputs, this interface module can be used with a number of sensors to extract rate-information. The concept takes advantage of existing (mounted) sensors rather than devising new sensing mechanisms. Thus, the cost for instrumentation and technical training is reduced, which is favorable to users. Also, higher derivatives may be obtained by cascading the interface modules so as to realize real-time sensing of new quantities. The simultaneous use of a voltage based signal and a calibrated user-provided quantity involving its derivative (another property) represents a generalized sensor solution. The ability to extract additional information from an existing sensor provides flexibility to the measurement and instrumentation engineer.

Differentiators, whether analog or digital, exhibit a transfer function that preferentially amplifies high-frequency components in the passband. The origin is that for a single frequency signal $F(t)\cos\omega t$, its derivative is $\omega \times F(t)\sin\omega t$. The $\omega$ in the derivative leads to preferential gain at high frequency. Noise in the passband cannot be filtered out and has an even spectral distribution. Signals, on the other hand, have predominant low-frequency components. As a result, noise level becomes amplified relative to the signal after the differentiation. For those sensor outputs with marginal signal-to-noise (S/N) ratio, differentiation could put the signal within the noise envelope, rendering the data useless.

Figure 2:
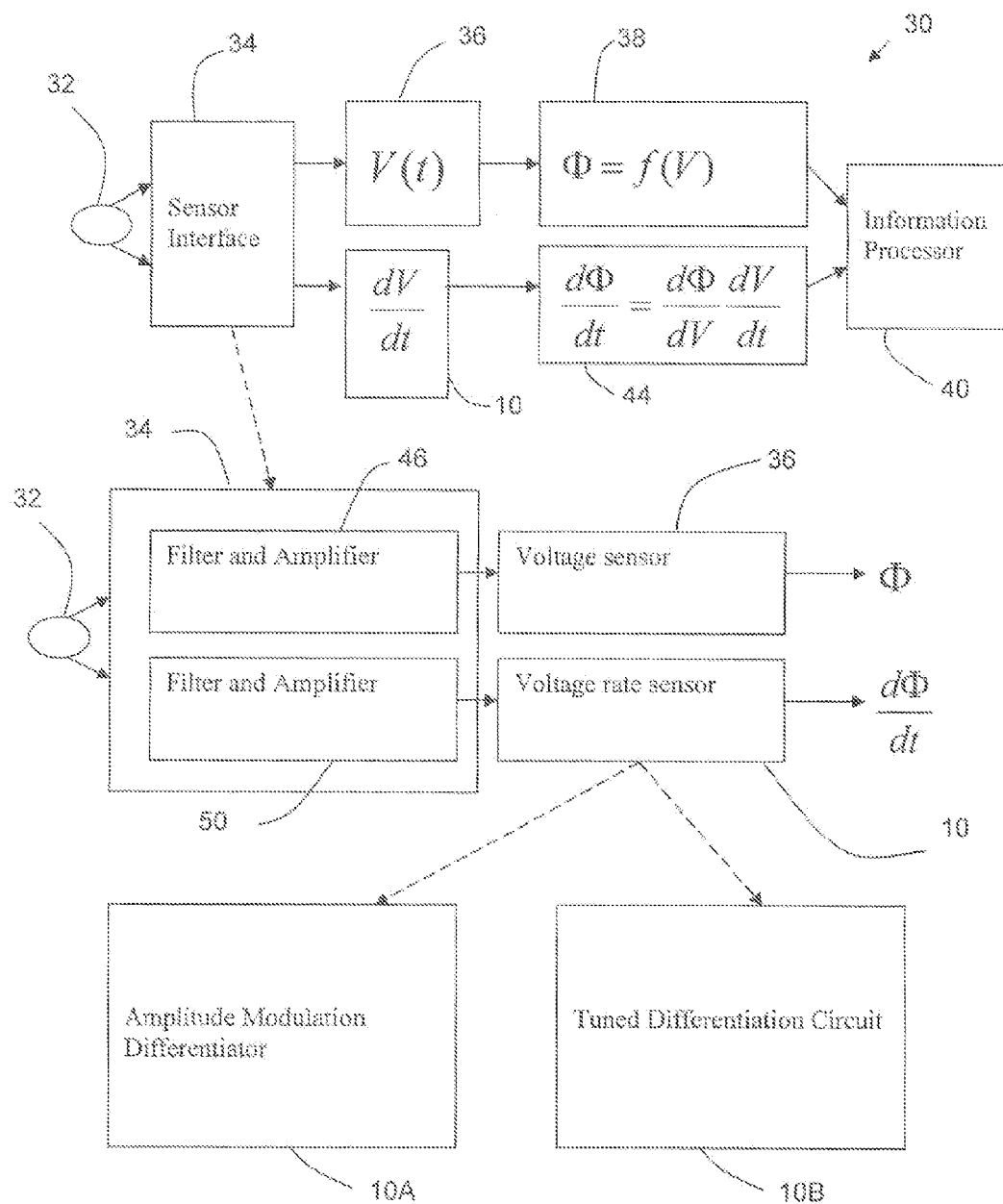
FIG. 2 depicts various aspects of voltage-rate sensor systems.

FIG. 2 illustrates an instrumentation system 30 that extracts rate-information from voltage outputs of transducers and permits real-time rate-based measurements to take place and be immediately applied. Preferred embodiments utilize existing transducers and information processing modules. Instrumentation system 30 includes a transducer 32. In some embodiments transducer 32 is a thermocouple. Transducer 32 is in operable communication with sensor interface 34 that provides filtering and amplification of signals from transducer 32. It shall be understood that the term "in operable communication with" refers to direct or indirect communication of suitable signals between two elements, either directly or indirectly through one or more intermediate elements. Sensor interface 34 is in operable communication with a voltage sensor 36 that may be used by a first calibration system 38 to derive property Φ that may be provided to an information processor 40. Property Φ may be temperature, pressure, stress, strain, intensity (such as electromagnetic radiation intensity), chemical concentration, or similar mechanical, chemical, electrical, atomic, or similar property for which a sensor may produce a corresponding variable voltage.

Instrumentation system 30 also includes a voltage rate sensor 10 that may be used by second calibration system 44 to derive property change rate dΦ/dt that is provided to the information processor 40. A calibration factor dΦ/dV used by second calibration system 44 is typically derived from a calibration curve. The calibration factor dΦ/dV may be a function of V, in which case output from the first calibration system 38 may be used as input to the second calibration system 44, or output from the first calibration system 38 may be used by the information processor 40 to interpret output from the second calibration system 44.

The middle portion of FIG. 2 further shows how voltage and voltage rate may be processed. Both the outputs (dV/dt and V) are used in the subsequent numerical algorithm to infer other quantities, and the results from the two paths may be used for comparison and validation of the signal processing strategy.

The bottom portion of FIG. 2 depicts two voltage rate sensor systems that may be employed to circumvent many of the difficulties associated with the frequency response of signal differentiation. One voltage rate sensor is an amplitude modulation differentiator 10A and the second voltage rate sensor is a tuned differentiation circuit 10B.

Figure 3:
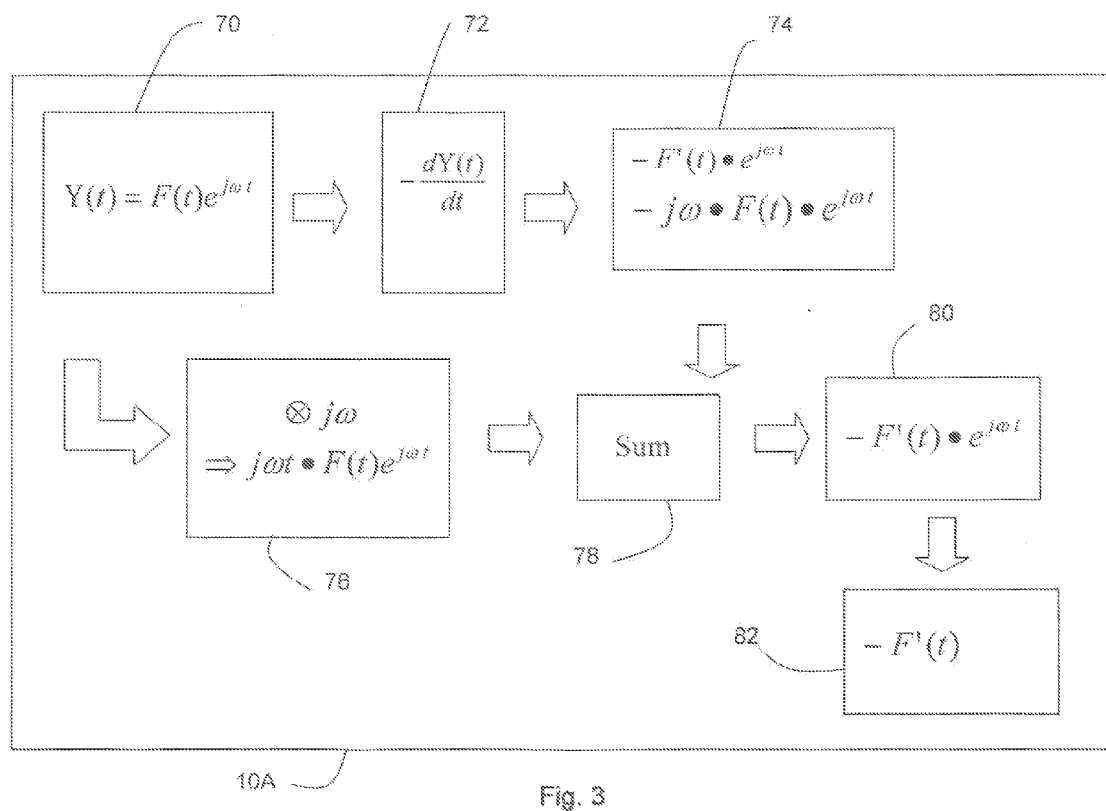
FIG. 3 depicts an overview of an AM differentiator embodiment of a voltage-rate sensor.

FIG. 3 illustrates details of the amplitude modulation differentiator 10A. The signal spectra F(t) is first up-converted by $\omega_m$ (16) in a modulation circuit 70. The modulated signal is then split into two paths. One signal path goes through a differentiation circuit (72) and generates two signal components (74), while the other path goes through a 90° phase shift circuit (76) (at $\omega_m$). The two correlated signals are fed to a summing circuit (78) which contributes to reducing noise in addition to producing a carrier with signal derivatives (80). That signal is fed to a demodulator (82), where demodulation and low-pass filtering are provided to maximize S/N ratio. The resultant output is a time derivative –F'(t) of the original signal spectra.

It should be appreciated that the amplitude modulation typically provides only a single-polarity waveform. However, in applications concerned only about heating or cooling rate, the temperature (voltage output) may be assumed to increase or decrease monotonically. Furthermore, a slope detector may be used in coordination with the amplitude differentiator to determine the end or start of sampling.

An amplitude modulated (AM) differentiator (e.g., amplitude modulation differentiator 10A) may be employed to improve the signal/noise ratio in the data-processing step. By shifting the operating frequency from DC to a much higher carrier frequency, frequency has less effect on the gain over the passband. Assuming a 100 Hz passband, without AM, ω changes by a 100 fold (from 1 to 100 Hz). In comparison, with a 10 kHz carrier AM, ω changes by 1% (from 10.001 kHz to 10.1 kHz). Consequently, with a AM differentiator, signals will have a gain factor close to that of noise, which translates to better S/N ratio for most applications.

Figure 4A:
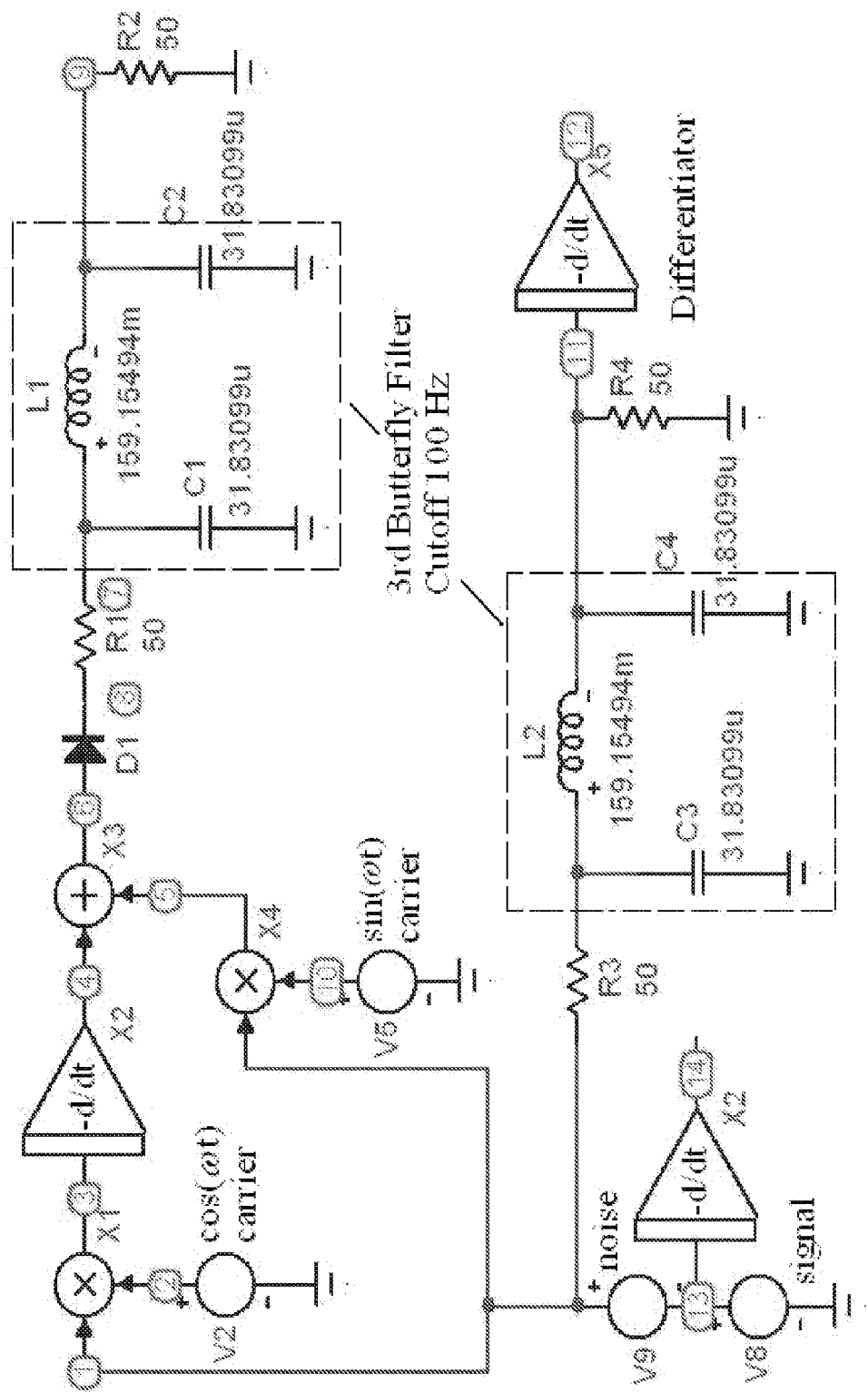
FIG. 4A depicts a circuit diagram of an AM differentiator that may be used in electronic simulation software to demonstrate AM differentiation.
Figure 4B:
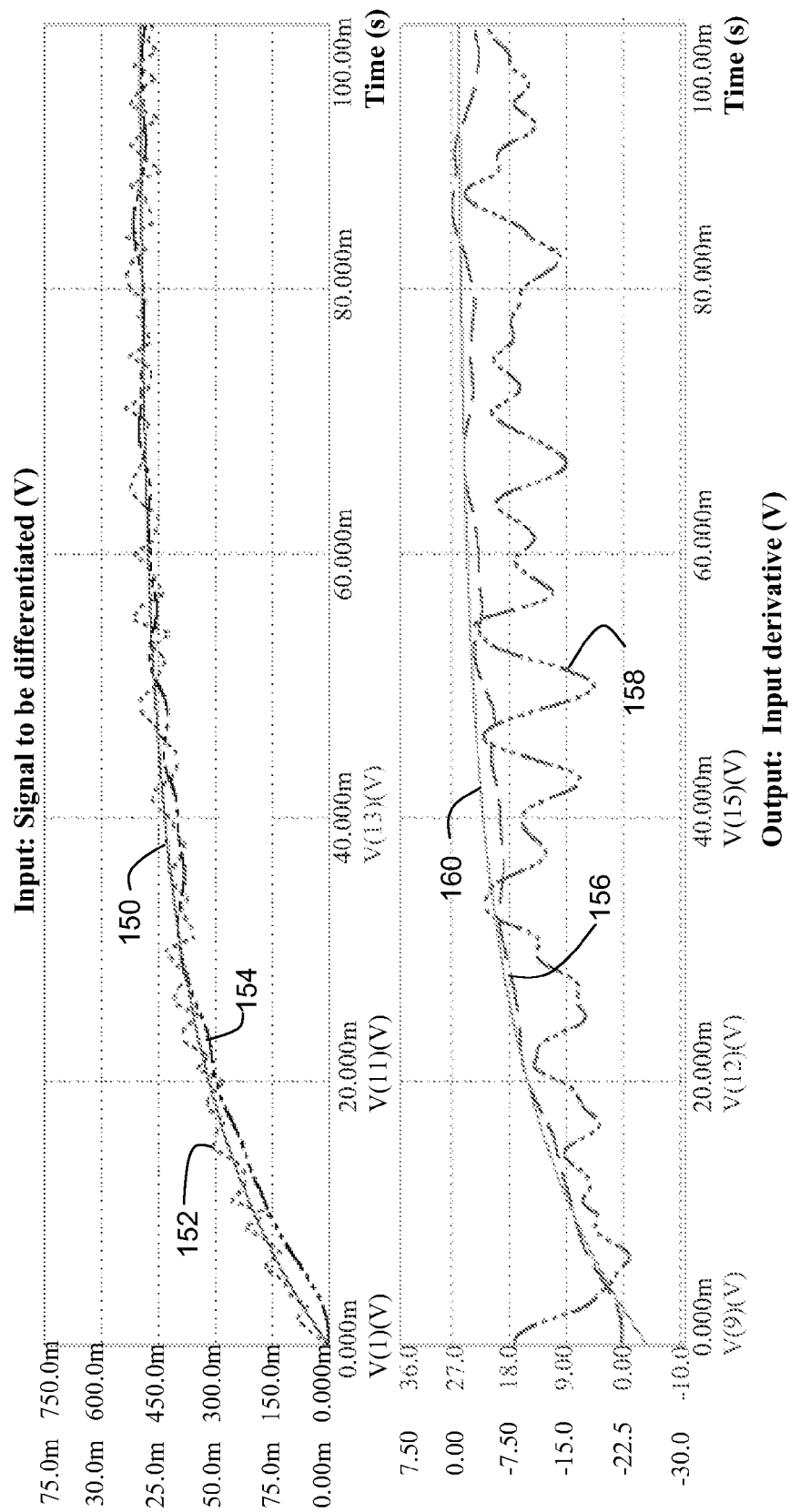
FIG. 4B depicts graphs of input and output signals going into and out of the circuit of FIG. 4A.

The upper portion of FIG. 4A depicts an AM differentiator circuit that may be used in electronic simulation software to demonstrate AM differentiation. For comparison purposes, the lower portion of FIG. 4A depicts a direct LC differentiator circuit. The simulation results shown in FIG. 4B illustrate the feasibility and advantage of the AM differentiator. The graphs of inputs and outputs are shown in the top and bottom parts of FIG. 4B, respectively. The spectrum of ideal (noise free) input locates mainly within 50 Hz, and the low-pass filter cuts off at 100 Hz. The upper portion of FIG. 4B depicts ideal input 150 compared with noisy input 152 provided to an amplitude modulation differentiator and filtered input 154 provided to a direct differentiator. In the bottom portion of FIG. 4B three outputs are depicted: derivative of noisy input using AM differentiator 156, derivative of filtered signal 158 from a direct differentiator, and derivative of ideal input 160. From the comparison in FIG. 4B, it can be seen that filtering alone (e.g. derivative of filtered signal 158) cannot resolve the S/N ratio difficulty in differentiation of signals. The output from the AM differentiator 156 generally follows the derivative of the ideal signal 160, showing that the design of AM differentiator is feasible. The derivation from the ideal output is well within the 20% tolerance when using rates for inverse analysis. The ripple or noise component can be reduced by application of coherent demodulation.

As previously indicated, analog circuitry such as the tuned differentiation circuit 10B in FIG. 2 represents a further embodiment for voltage differentiation. Preferably, filtering and low-noise amplification (such as by filter and amplifier 50 in FIG. 2) are provided based upon the anticipated voltage sources. The voltage rate is obtained from voltage generated by a low-voltage measurement device, such as thermocouple 32. The technical difficulty lies with signal conditioning and management of impedances throughout the circuit design. The input signals (such as from thermocouples) are in the microvolt to millivolt magnitude range and cover the low-frequency range. For that type of signal acquisition, special care must be taken owing to lags and error magnification from flicker noise (1/f noise, significant at very low frequencies) and intrinsic white noise (e.g., Johnson noise in resistors and op-amps beyond the corner frequency). The amplification of microvolt and millivolt input signals must be realized without introducing significant amounts of lag and/or additional noise, thus the signal spectra and the frequency response of the amplification process must be addressed. The differentiating circuit requirements are stringent and require detailed attention also due to its frequency responses. This can be done with the aid of discrete Fourier transform analysis on an existing temperature history of data. (For example, see FIGS. 13B and 16B, described later herein.)

The mathematical direction is as follows. Consider the chain rule of differential calculus for the heating rate, dT/dt in terms of the intermediate function, voltage; namely, $$\frac{dT}{dt} = \frac{dT}{dV}\frac{dV}{dt}, \tag{1a}$$

where it is assumed that it is possible to measure the voltage rate, dV/dt. The term dT/dV is obtained from the calibration curve of the thermocouple which is normally given in terms of truncated Taylor series about the reference point, say T=0° C. (NIST standard, ITS-90). Thus, to obtain the heating/cooling rate of an existing sensor requires the careful handling of the voltage. The second derivative can be obtained as $$\frac{d^2T}{dt^2} = \left(\frac{dV}{dt}\right)^2 \frac{d^2T}{dV^2} + \frac{dT}{dV}\frac{d^2V}{dt^2}, \quad (1b)$$

again where V represents the voltage at the thermocouple junction. It is evident that careful management of impedances is required in the circuit design to take the final output (measurable) quantity and work backwards through the circuitry to the thermocouple junction. The decompositions expressed in Eqs. (1a) and (1b) can be generalized to any quantity that is presently obtained through a voltage measurement.

Figure 5:
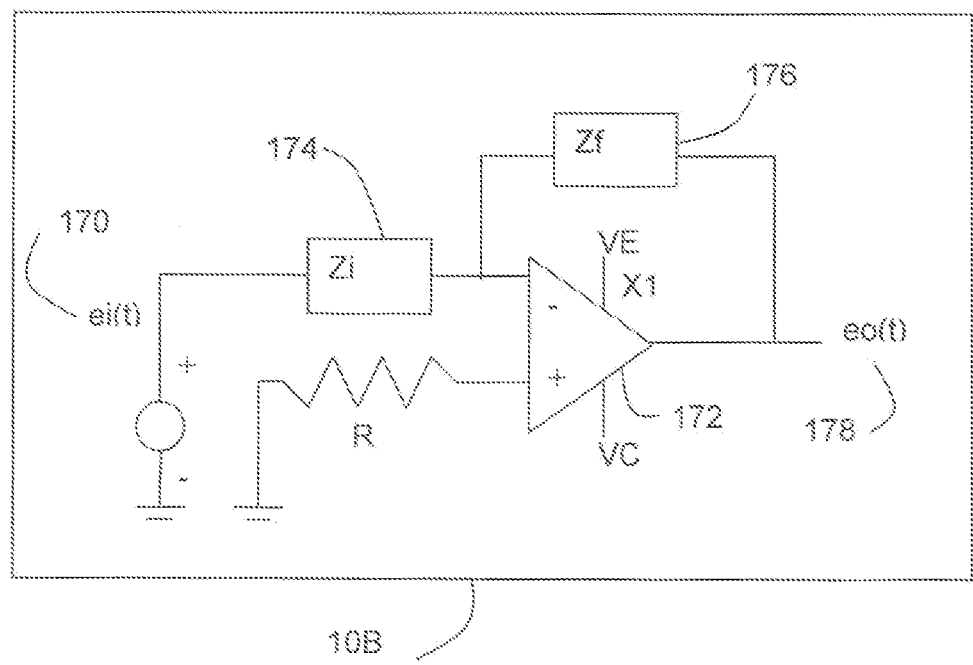
FIG. 5 depicts certain details of a tuned differentiation circuit embodiment of a voltage-rate sensor.

FIG. 5 provides an overview of the analog tuned differentiation circuit 10B of FIG. 2. An input signal ei(t) 170 is in operable communication with an operational amplifier 172 through an input impedance Zi 174. A feedback impedance Zf 176 is provided across operational amplifier 172. Output signal eo(t) 178 is substantially $$-\frac{Z_f}{Z_i} \times \frac{dei(t)}{dt}.$$

The details of design parameters for Zi and Zf are presented later herein.

Figure 6A:
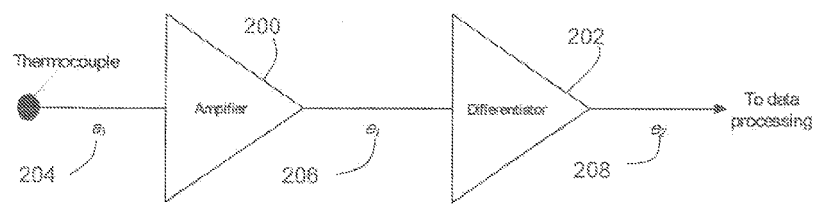
FIGS. 6A and 6B depict a differential amplifier in series with an analog differentiator according to a preferred embodiment.
Figure 6B:
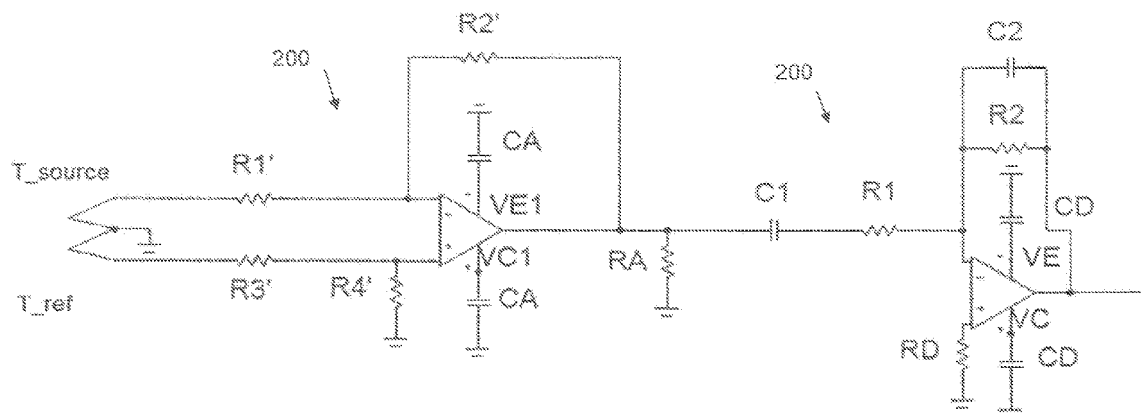

FIGS. 6A and 6B depict a simplified differential amplifier 200 in series with an analog differentiator 202 according to a further embodiment. With reference to FIG. 6A, $e_0$ 204 is a thermocouple signal (in millivolts), $e_1$ 206 is an amplified signal where $e_1=-Ge_0$ (amplified into Volts), and $e_2$ 208 is the differentiated signal, where $$e_2 = -R_2 C_1 \frac{de_1}{dt}$$

$$= GR_2 C_1 \frac{de_0}{dt} \text{ and } \frac{dT}{dt}$$

$$= \left(\frac{dT}{de_0}\right)\left(\frac{de_0}{dt}\right), \text{ where } \left(\frac{dT}{de_0}\right)$$

is determined from NIST thermocouple calibration data. Thus, $e_2$ maps to $$\left(\frac{dT}{dt}\right)$$

and $e_1$ maps to T.

In designing the circuitry of FIGS. 6A and 6B, an understanding of the physical spectral phenomena (e.g., by use of discrete Fourier transforms) is helpful in order to size the necessary resistors and capacitors, and for determining the appropriate op-amps for each stage. The electrical time constant should take into account the cut-off frequency. Additionally, understanding, care and caution are required in determining the system impedances which must be sized in an appropriate fashion in order to accurately back track to the desired thermocouple voltage with a minimal delay.

In regard to the operational amplifiers depicted in the embodiment of FIG. 6B, Microcap8 simulations indicate that operational amplifier model numbers op07 and op27 are optimal choices for the present low-frequency application based on voltage offset, low noise and output voltage magnitude to low frequency input. In a preferred embodiment of the invention, the amplifier 200 is based on the INA114 chip, where gain is dictated by one resistor which could be variable to provide gain adjustment for the user.

Figure 7A:
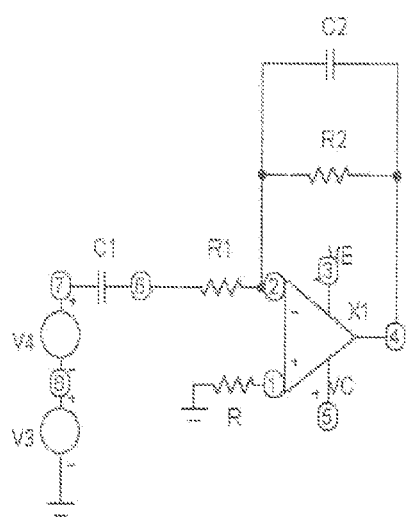
FIGS. 7A and 7B depict differentiator circuits according to preferred embodiments.

A preferred embodiment of the differentiator circuit 30 is depicted in FIG. 7A. The feedback and input impedances are defined as:

$$\frac{1}{Z_f} = \frac{1}{R_2} + \frac{1}{1/C_2 D} = \frac{1}{R_2} + C_2 D = \frac{1+R_2 C_2 D}{R_2}, \quad (2a)$$

$$Z_i = R_1 + \frac{1}{C_1 D} = \frac{R_1 C_1 D + 1}{C_1 D}, \quad (2b)$$

respectively, where D represents the differential operator d/dt. For an ideal op amp (infinite gain), the relationship between input and output becomes $$e_0(t) = -\frac{Z_f}{Z_i} e_i(t). \quad (3a)$$

Using Eqs. (2a) and (2b), $$e_0(t) = -\frac{R_2}{1+R_2 C_2 D} \times \frac{C_1 D}{1+R_1 C_1 D} \times e_i(t). \quad (3b)$$

With time constants expressed as $$\tau_1 = R_1 C_1 \quad (4a)$$

and $$\tau_2 = R_2 C_2, \quad (4b)$$

Eq. (3b) is expressed as $$\tau_1 \tau_2 D^2 e_0(t) + (\tau_1 + \tau_2) D e_0(t) + e_0(t) = -R_2 C_1 D e_i(t). \quad (4c)$$

If $\tau_1 = \tau_2 = \tau$, then Eq. (4c) becomes $$\tau^2 D^2 e_0(t) + 2\tau D e_0(t) + e_0(t) = -R_2 C_1 D e_i(t), \quad (4d)$$

subject to the appropriate initial conditions. It will be appreciated that the functioning of the invention is in no way dependent on equality of the time constants $\tau_1$, $\tau_2$ and $\tau$. The exact solution to this constant coefficient differential equation may be expressed as $$e_0(t) = Ae^{-\frac{t}{\tau}} + Bte^{-\frac{t}{\tau}} + \int_t f(u)(t-u)e^{-\frac{t-u}{\tau}} du, \text{ for } t>0, \quad (5a)$$

where $$f(t) = \frac{-R_2 C_1}{\tau^2} De_i(t). \quad (5b)$$

As appreciated by one skilled in the art, the input function $e_i(t)$ may be represented by a Fourier series. Thus, substituting $$e_i(t) = c \sin(2\pi ft), \quad (5c)$$

into Eq. (5a) produces $$e_0(t) = (A + Bt)e^{-\frac{t}{\tau}} - \frac{1}{(1+4f^2\pi^2\tau^2)^2} \qquad (6a)$$
$$[2cf\pi\tau^2(-1+4f^2\pi^2\tau^2)z_1\cos(2\pi ft) -$$
$$8cf^2\pi^2\tau^3 z_1 \sin(2\pi ft)],$$

where $$z_1 = \frac{-R_2 C_1}{\tau^2}. \qquad (6b)$$

Figure 7B:
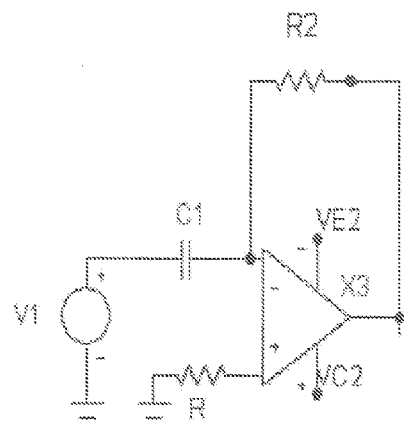

FIG. 7B depicts an ideal differentiator. For this case, it should be appreciated that $$e_o(t) = -R_2 C_1 D e_i(t), \qquad (7a)$$

the exact solution of which is (using Eq. (5c) as the input function)

$$e_o(t) = -R_2 C_1 c 2\pi f \cos(2\pi ft). \qquad (7b)$$

By comparing Eq. (6a) with Eq. (7b), conditions may be obtained (after passing of the transient) in which the circuit of FIG. 7A permits a good interpretation of the derivative of the input based on a measurement of the output voltage. The desired constraints appear as $$f^2\tau^2 \ll \frac{1}{4\pi^2}, \qquad (8a)$$

$$cf^2\tau R_2 C_1 \ll \frac{1}{8\pi^2}. \qquad (8b)$$

For the situation wherein $\tau_1 = \tau_2 = \tau$, it is desired that $C_2 < C_1$ and $R_1 < R_2$.

Thus, for a commercial differentiator, $$e_0(t) = -\frac{1}{(1+4f^2\pi^2\tau^2)^2} * \qquad (9)$$
$$[-2\pi R_2 C_1 cf(-1+4f^2\pi^2\tau^2)\cos(2\pi ft) +$$
$$8cR_2 C_1 f^2\pi^2\tau\sin(2\pi ft)],$$

and for an ideal differentiator, $$e_o(t) = -2\pi R_2 C_1 cf \cos(2\pi ft), \qquad (10)$$

where the input signal is $$e_i(t) = c \sin(2\pi ft), \qquad (11)$$

and the optimal parameters are $$f^2\tau^2 \ll \frac{1}{4\pi^2} \text{ and } cf^2\tau R_2 C_1 \ll \frac{1}{8\pi^2}., \qquad (12a)(12b)$$

Although the restraints of equations 12a and 12b may provide optimal performance, it will be appreciated that the invention is not limited by these restraints. In fact, the benefits of the present invention may be realized even when $$f^2\tau^2 \cong \frac{1}{4\pi^2} \text{ and } cf^2\tau R_2 C_1 \cong \frac{1}{8\pi^2}.$$

Figure 8:
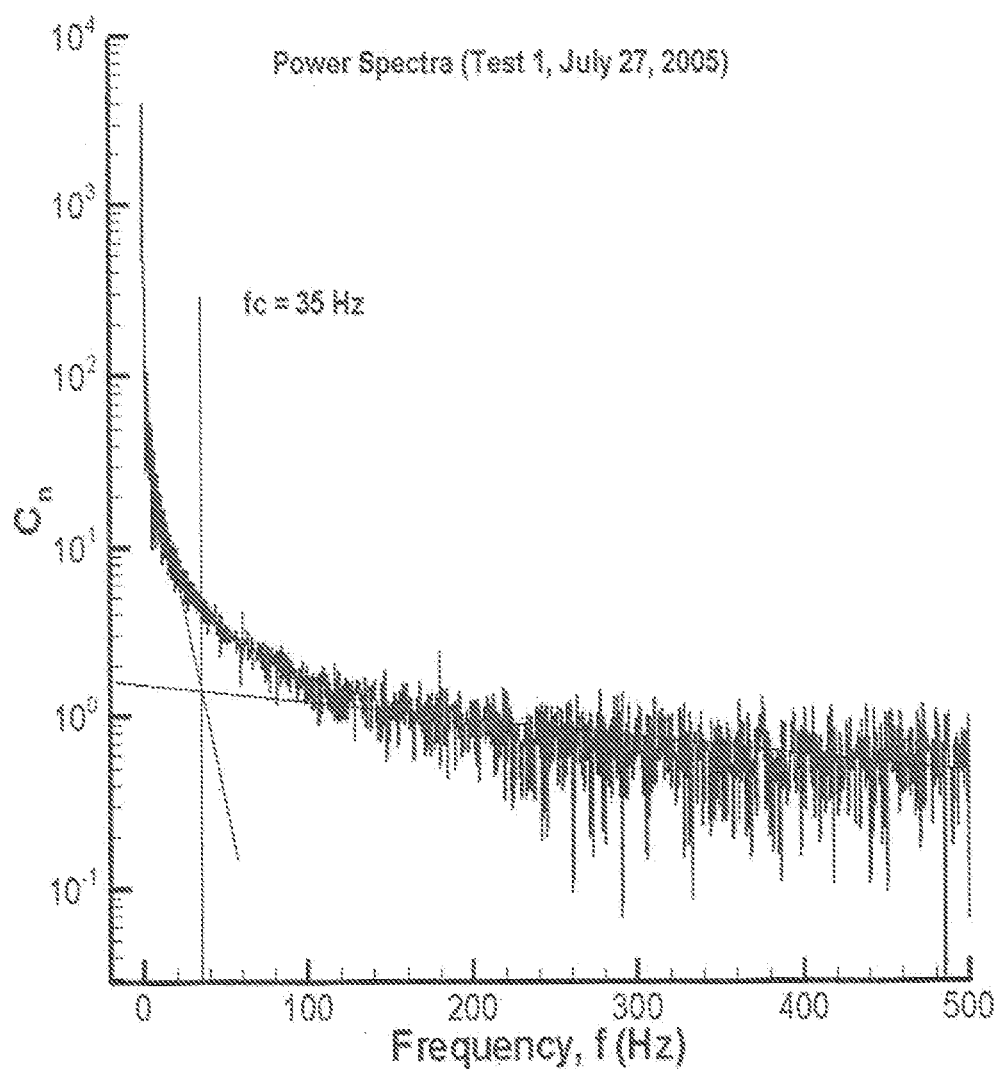
FIG. 8 depicts power spectra data from a thermocouple test.

As shown in FIG. 8, the cutoff frequency, $f_c$ of the differentiator may be defined using DFT (power spectra of the in-situ thermocouple signal) based on Weiner filtering concepts associated with signal-to-noise ratio. Based on the cutoff frequency, the differentiator time constant, $\tau$, may be determined according to:

$$\tau \ll \sqrt{\frac{1}{4\pi^2 f_c^2}}.$$

Figure 9A:
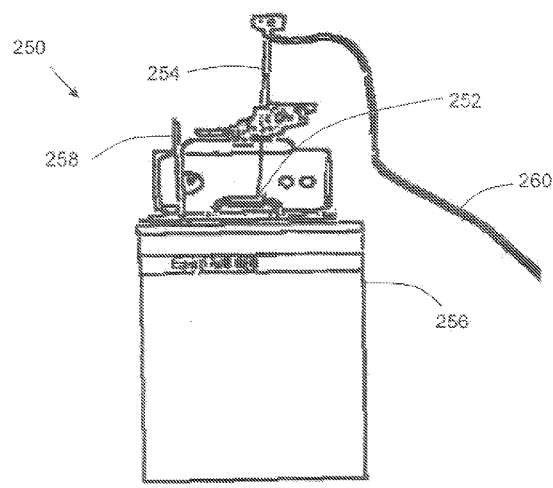
FIG. 9A depicts a thermocouple drop test for modeling a first-order time constant formulation.

To illustrate the feasibility of this approach, a simplified experiment was devised for illustrating the proof-of-concept. FIG. 9A displays a thermocouple drop test apparatus 250 for modeling a first-order time constant formulation (room temperature to hot bath). The test setup employs a type T thermocouple 252 which is dropped using a gravity drop device 254 into constant temperature bath 256 maintained at T<50° C. A thermometer 258 is provided for checking the temperature. Voltage from the thermocouple is obtained from thermocouple leads 260. The expected theoretical temperature solution is exponential in nature as is its heating/cooling rate, dT/dt. Consider the lumped heat equation:

$$\frac{dT}{dt}(t) = -\beta(T(t) - T_\infty), t \geq 0,$$

subject to the initial condition $T(0) = T_0$, the exact solution of which is $T(t) = T_\infty + (T_0 - T_\infty)e^{-\beta t}$, $t \geq 0$. The time constant, $\tau$ is related to $\beta$ as $\beta = 1/\tau$. The time constant is determined from $$\frac{T(\tau) - T_\infty}{T_0 - T_\infty} = e^{-1}$$

which corresponds to $t = \tau$, i.e., the system has responded to 63.2% of the step change. The derivative of the exact solution (heating/cooling rate) is $$\frac{dT}{dt}(t) = -\beta(T_0 - T_\infty)e^{-\beta t}, t \geq 0.$$

Figure 9B:
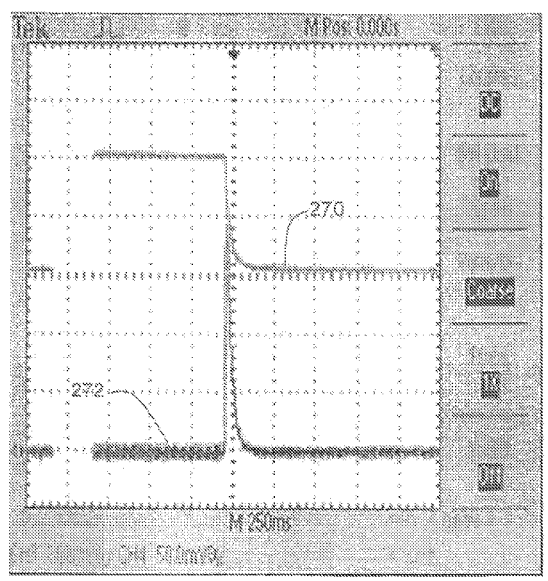
FIG. 9B depicts oscilloscope traces representative of thermocouple temperature and the voltage rate from the thermocouple drop test.

Sensitivity analysis yields $$Z(T, \beta) = \frac{\partial T}{\partial \beta} = -t(T_0 - T_\infty)e^{-\beta t},$$

which when plotted, as shown in FIG. 9B, indicates that the greatest sensitivity to the data corresponds to $t = \tau$.

FIG. 9B displays an oscilloscope trace of the amplified voltage 270 representative of thermocouple temperature and output voltage 272 representative of the voltage rate of the thermocouple. Several mathematical expressions are required to obtain dT/dt. However, the significant point here is that noise amplification in the differentiation process can be controlled and limited through a clear understanding of the signal frequency and S/N ratio. Also note that this experiment cannot be directly used to benchmark the heating/cooling rate sensor owing to the assumed jump nature in the mathematical model for the heating/cooling rate. The present sensor actually exhibits the true early-time growth in the heating rate before the exponential decay begins.

To demonstrate the capability of the present invention of detecting subtle or minute changes in a thermal process, the thermocouple drop test experiment is performed using a thermocouple having two different lead configurations. In test case A, the thermocouple has uninsulated leads, whereas in test case B the thermocouple leads are insulated by plastic sleeves over the leads. In case A, since the leads are uninsulated, there is negligible heat loss which is more like a lumped system model. In case B, there are significant heat losses along the insulated leads which act less like a lumped system model. In this experiment, the same thermocouple is used in cases A and B. Only the positions of the plastic insulation sleeves are changed from one case to the other.

As shown in FIGS. 10A-10D, the temperature response curves for the two cases are very similar. FIGS. 10A and 10B depict the temperature and temperature rate information, respectively, for Case A. FIG. 10A depicts a theoretical temperature curve 300 and an experimental temperature curve 302. Both curves 300 and 302 begin a significant temperature rise at time 304 which occurs at t=0.122 seconds. In FIG. 10B curve 310 represents the theoretical temperature rate and curve 312 represents the experimental temperature rate. FIGS. 10C and 10D depict the temperature and temperature rate information, respectively, for Case B. In FIG. 10C curve 320 represents the theoretical temperature and curve 322 represents the experimental temperature. Both curves 320 and 322 begin a significant temperature rise at time 324 which occurs at t=0.097 seconds. In FIG. 10D curve 330 represents the theoretical temperature rate and curve 332 represents the experimental temperature rate. The time constants for Cases A and B are 0.0295 second and 0.0315 second, respectively. Although the difference between the two time constants is within experimental uncertainty, the temperature rate curves clearly show that there are distinct differences between the two sensor configurations. In fact, the differences are attributable to the conduction losses through the leads. Thus, the temperature rate information clearly indicates that there are differences between the two thermocouple configurations. These differences are not so apparent in the raw temperature data.

The following section discusses the rationale and advantages associated with developing new, rate-based thermal sensors for the aerospace, heart treatment, defense and homeland security applications. Four heat transfer problems are reviewed illustrating the importance of the data choice: (i) Surface Heat Transfer, (ii) Two-Dimensional Surface Heat Conduction—Abel Generalization, (iii) Inverse Heat Conduction (ill-posed problem), and (iV) Real-Time Inverse Heat Conduction.

(i) Surface Heat Transfer:

The generic problem is illustrated by the heat transmission in the half-space, whereby the goal is to predict in real time the surface heat flux based on signals from an embedded surface sensor. At the boundary of the medium the following integral relationships hold:

$$T(0, t) = \lambda \int_{u=0}^{t} q''(0, u) \frac{du}{\sqrt{t-u}} \quad (13a)$$

$$q''(0, t) = \frac{1}{\lambda \pi} \int_{u=0}^{t} \frac{\partial T}{\partial u}(0, u) \frac{du}{\sqrt{t-u}}, t \geq 0 \quad (13b)$$

where $T(0,t)$ is the surface temperature, $q''(0,t)$ is the surface heat flux, t is the time, and $\lambda = 1/(k\rho c \pi)^{1/2}$ describes the thermophysical properties of the half space. It is further assumed that the trivial initial condition prevails. Here, k is the thermal conductivity, $\rho$ is the density and c is the heat capacity. These relations show that while the temperature at the boundary is expressed in terms of the heat flux, $q''$, the latter is reconstructed from the heating/cooling rate, dT/dt. Thus, the noise present in the temperature data emerges hugely amplified in the heat flux.

It is highly relevant to note that a considerable amount of misunderstanding exists with regard to using temperature measurements in order to acquire the heat flux from Eq. (13b). For example, rewriting Eq. (13b) as $$q''(0, t) = \frac{1}{\lambda \pi}\left(\frac{T(0, t)}{\sqrt{t}} + \frac{1}{2}\int_{u=0}^{t} \frac{T(0, t) - T(0, u)}{(t-u)^{3/2}} du\right), t > 0, \quad (14)$$

does not reduce or minimize the ill-posed mathematical nature of Eq. (13b). A substantial amount of effort has been unnecessarily directed toward the discretization of Eq. (14) only to yield unsatisfactory results. In practical situations, often even after the discretization has been performed, smoothing of q"(0,t) is still required. Clearly, this removes or significantly impairs real-time heat flux predictions.

FIG. 11A shows simulated temperature sensor data (T) 400 and heating/cooling rate (dT/dt) 402 sensor data contaminated with different levels of white noise. The error in the T data 400 is 8 times smaller than the dT/dt data 402. (M=2400 samples, solid lines=exact). In the simulation of FIG. 11A, no bias is assumed to exist. The simulation parameters are as follows:

$$q''(0, t) = q_s''(t) = q_o'' e^{-\left(\frac{t-b}{\sigma}\right)^2},$$

$\epsilon_1=0.0125$, $\epsilon_2=0.1$, $b=2.5\times10^{-4}$ s, $\sigma=5\times10^{-5}$ s, $q_o''=75$ kW/cm$^2$, k=52 W/(m $^\circ$ C.), $\rho c_p=1.73\times10^6$ J/(m$^{3\circ}$ C.), $t_{max}=0.001$ sec., $t_i=i\Delta t$, i=1, 2, . . . , M, $\Delta t=t_{max}/M$. The root-mean squares of the output error is $$\|\varepsilon_{out}\|_2 = \sqrt{\frac{\sum_{i=1}^{M}(q_s''(t_i) - q_{s,i}'')^2}{M}},$$

where $q''_{s,i}$ for i=1, 2, . . . M are numerically obtained values. The noisy data are generated based on $$T_{s,i}=T_s(t_i)+\|T_s(t)\|_\infty \epsilon_1 Random_{1,i}[-1,1],$$

$$\frac{dT_{s,i}}{dt} = \frac{dT_s}{dt}(t_i) + \left\|\frac{dT_s}{dt}(t)\right\|_\infty \varepsilon_2 Random_{2,i}[-1,1],$$

$$i = 1, 2, \ldots M,$$

where $T_s(t)=T(0,t)$, $\|\Psi\|_\infty = \max_{t \in [0, t_{max}]} |\Psi(t)|$ and $\epsilon_k$ are noise factors.

FIG. 11B displays the predicted heat flux 404 based on T data using the Cook-Felderman method and is clearly useless for real-time analysis. In FIG. 11B, the solid line 406 is the exact Gaussian pulsed heat flux solution. Flux is based on Eq. (13a).

Figure 12A:
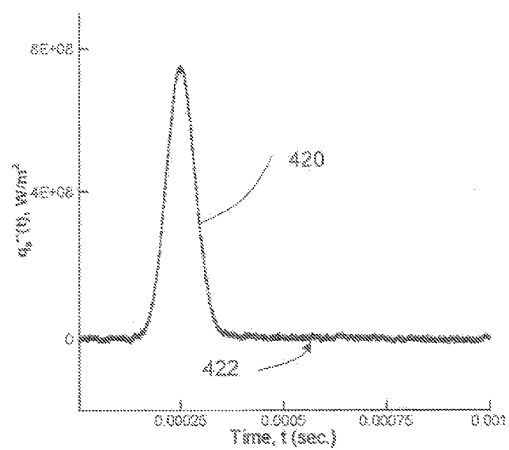
FIG. 12A depicts results for predicted heat flux based on unfiltered dT/dt data using a rectangular integration rule.

In contrast, FIG. 12A displays the highly accurate and usable results for the predicted heat flux based on unfiltered (raw) dT/dt data 420 using a rectangular rule of integration. The solid line 422 is the exact Gaussian pulsed heat flux solution. Flux is based on Eq. (13b).

Figure 12B:
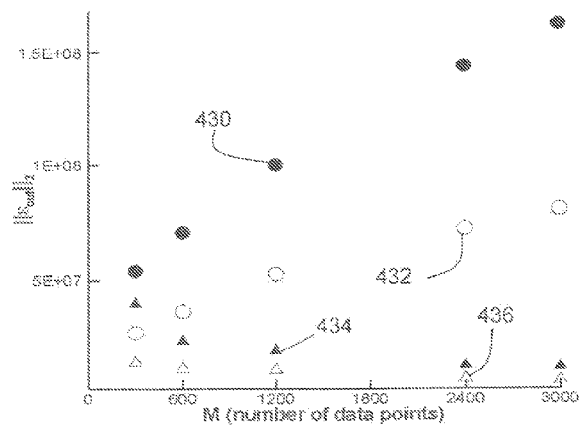
FIG. 12B depicts calculated root-mean square (RMS) error of predicted heat flux resulting from data sets as the data density is increased.

FIG. 12B presents the calculated root-mean square (RMS) error of the predicted heat flux resulting from the data sets as the data density is increased. (Circles represent T data, (solid circles 430 −2.5% error, open circles 432 −1.25% error); triangles represent dT/dt data, (solid triangles 434 −20% error, open triangles −10% error). The surface temperature data is calculated according to $$\sqrt{\frac{1}{M}\sum_{k=0}^{M-1}|\Delta q''(0,t_k)|^2} \approx \sqrt{\frac{k\rho C \varepsilon_1^2 \|T\|_\infty^2 s^2 \pi (M-1)}{t_{max}}}$$

and the surface heating/cooling rate data is calculated according to $$\sqrt{\frac{1}{M}\sum_{k=0}^{M-1}|\Delta q''(0,t_k)|^2} \approx \sqrt{\frac{k\rho C \varepsilon_2^2 \left\|\frac{dT}{dt}\right\|_\infty^2 s^2 t_{max} \ln(M)}{2\pi M}}$$

for $M \gg 1$, where $s^2 \approx 1/3$ and $\varepsilon_1$ and $\varepsilon_2$ are noise factors associated with white noise.

The calculated RMS error of the heat flux based on dT/dt decreases as the sample density increases. Meanwhile, the calculated RMS error of the heat flux, based on T, increases as the sample density increases. Thus, theoretical calculations and numerical simulations fully demonstrate the significantly increased accuracy, robustness, and implementation potential of the rate-sensor based paradigm of the present invention that will lead to real-time results.

There is generally a significant disconnect between numerical analysis and experimental techniques utilizing (i) digital filtering and (ii) sensor/transducer design. Typically, the inverse studies tend to focus on numerical methods without incorporating the proper integration of sensors and its corresponding frequency analysis into the numerical process. In the past, this substantially incomplete viewpoint has impaired the resolution of many ill-posed problems. Transient field equations can be interrogated in both the time and frequency domains for developing sensor solutions to ill-posed problems. For example, the numerically obtained RMS results displayed in FIG. 12B may be qualitatively (i.e., behaviorally) developed a priori through analysis. For example, the root-mean square heat flux error behaves as:

$$\sqrt{\frac{1}{M}\sum_{k=0}^{M-1}|\Delta q(0,t_k)|^2} \le C_0\sqrt{M-1},\quad (15a)$$

$$\sqrt{\frac{1}{M}\sum_{k=0}^{M-1}|\Delta q(0,t_k)|^2} \le C_1\sqrt{\frac{\ln M}{M}},\quad (15b)$$

due to use of temperature and heating/cooling rate data, respectively. Here, the constants $C_0$, $C_1$ contain thermophysical parameters, time duration of the experiment and noise factor information from the simulation. The mathematical trends displayed in Eqs. (15a) and (15b) match the numerically obtained results from the solution of Eq. (1). Under certain conditions, it is possible to extract the external heating loads taking place at the boundary as a follow up.

Figure 13A:
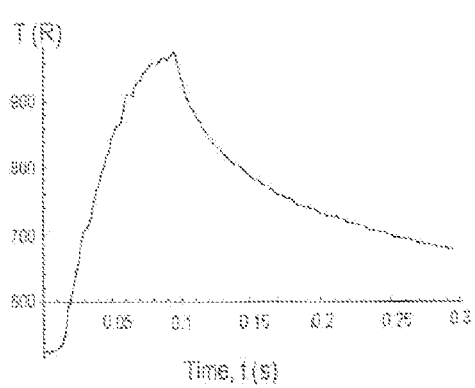
FIG. 13A depicts measured temperature data from a thermocouple during a high-powered, short-duration heat transfer experiment.
Figure 13B:
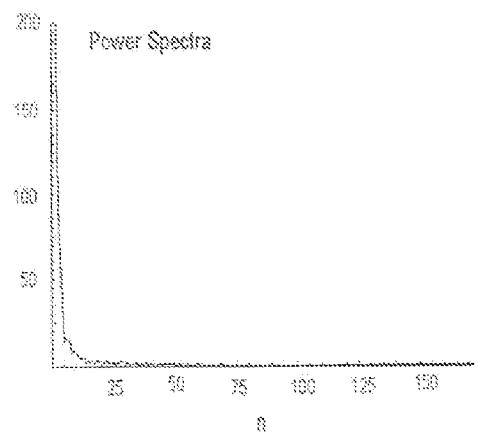
FIG. 13B depicts the corresponding frequency spectral data from the measured data of FIG. 13A.
Figure 13C:
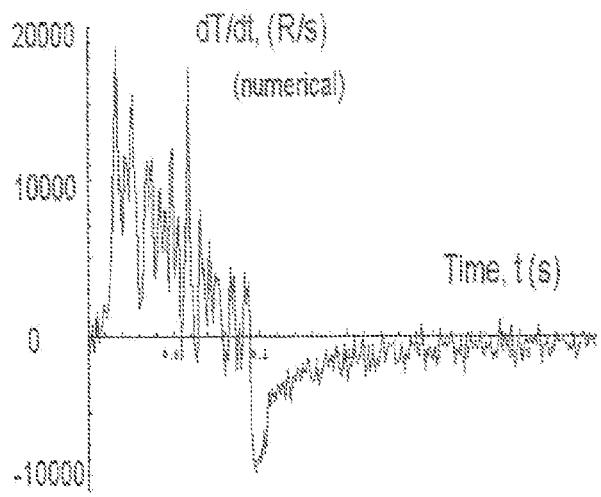
FIG. 13C depicts the temperature rate data associated with the temperature data of FIG. 13A.

The reductions in signal/noise ratio resulting from the use of rate-based sensors for surface heat transfer analysis may be further illustrated using the voltage curves and frequency spectrum of FIGS. 13A-13C. FIG. 13A presents real experimental temperature data from a thermocouple during a typical high-powered, short-duration heat transfer experiment (arcjet)($t_{max}$=time of experiment=0.3 seconds). The corresponding frequency spectra are depicted in FIG. 13B and the rate data (dT/dt) is depicted in FIG. 13C. In this case, the thermocouple is mounted on the surface of a plate exposed to a high incoming heat flux. These plots verify the low-frequency dominated phenomenon.

Based on FIG. 13B, the corresponding cut-off frequency, $f_c$ may be estimated to occur at $n_c$=25 (i.e., $f_c = n_c/t_{max}$=75 Hz). For the moment, this cut-off frequency is defined at the estimated location where noise begins to dominate the signal (per Weiner-type analysis). For this particular case, careful digital filtering may be used in the temperature data for real time use in health monitoring applications.

Since q"(0,t) and T(0,t) from the data of FIGS. 13A-13C are known, it is possible to decompose convective and radiative loads based on appropriate assumptions. The boundary condition at x=0 is $$q''(0,t) = -\bar{h}[T(0,t)-T_\infty] - \bar{\varepsilon}\sigma[T^4(0,t)-T_r^4].$$

Developing the residual equation produces $$r_i = q''_i \bar{h}[T_i - T_\infty] - \bar{\varepsilon}\sigma[T_i^4 - T_r^4],\text{ for }i=1,2,\ldots,M,$$

where M is the number of samples. Using the L-S Method, both $\bar{\varepsilon}$ and $\bar{h}$ may be determined. Thus, the radiative and convective loads are available.

Figure 14:
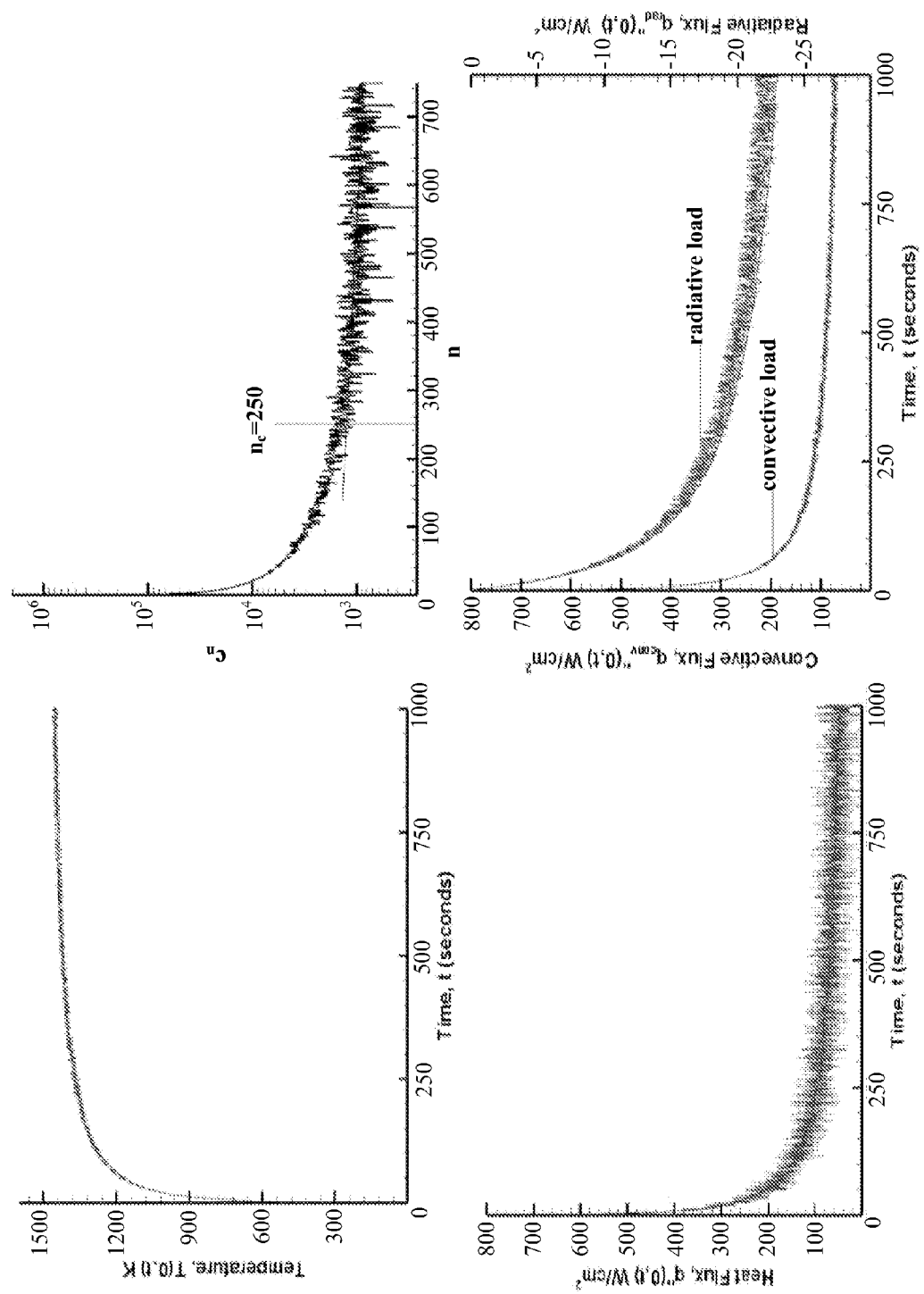
FIG. 14 depicts example temperature, heat flux and radiative and convective loads based on noisy surface sensor data.

FIG. 14 depicts example temperature, heat flux and radiative and convective loads with a noisy signal (red traces) and a filtered signal (blue traces). Black traces represent numerical exact calculations. Here, the number of samples, N, is 1500, $\bar{\varepsilon}$=0.9, $\bar{h}$=0.5 W/(cm² K), $T_0$=0 K, $T_r$=0 K, $T_\infty$=1600 K, $t_{max}$=1000 s, $\alpha$=0.2 cm²/s, k=0.8W/(cm K) and noise $\gamma_0$=0.01.

Table 2 lists predicted emissivity and heat transfer coefficients for various values of N.

TABLE 2

| N | $n_c$ | Unfiltered h | Unfiltered $\varepsilon$ | Filtered h | Filtered $\varepsilon$ | Unfiltered RMS (est.) | Filtered RMS (est.) |
|---|---|---|---|---|---|---|---|
| 1000 | 200 | 0.504 | 0.899 | 0.500 | 0.866 | 20.9 | 6.41 |
|  | 250 |  |  | 0.502 | 0.901 |  | 7.48 |
|  | 300 |  |  | 0.503 | 0.912 |  | 8.83 |

TABLE 2-continued

| N | $n_c$ | Unfiltered h | Unfiltered $\epsilon$ | Filtered h | Filtered $\epsilon$ | Unfiltered RMS (est.) | Filtered RMS (est.) |
|---|---|---|---|---|---|---|---|
| 1500 | 200 | 0.499 | 0.867 | 0.499 | 0.882 | 24.9 | 5.78 |
| | 250 | | | 0.500 | 0.892 | | 6.58 |
| | 300 | | | 0.501 | 0.901 | | 7.45 |
| 2000 | 200 | 0.494 | 0.818 | 0.495 | 0.859 | 28.8 | 5.02 |
| | 250 | | | 0.496 | 0.867 | | 5.58 |
| | 300 | | | 0.497 | 0.874 | | 6.27 |
| | 350 | | | 0.498 | 0.879 | | 7.08 |
| 2500 | 200 | 0.492 | 0.792 | 0.496 | 0.859 | 31.6 | 4.76 |
| | 250 | | | 0.497 | 0.865 | | 5.41 |
| | 300 | | | 0.497 | 0.870 | | 6.14 |
| | 350 | | | 0.498 | 0.874 | | 6.92 |
| | 400 | | | 0.498 | 0.877 | | 7.74 |
| 3000 | 200 | 0.488 | 0.761 | 0.495 | 0.853 | 35.0 | 4.37 |
| | 250 | | | 0.496 | 0.857 | | 4.84 |
| | 300 | | | 0.496 | 0.861 | | 5.46 |
| | 350 | | | 0.497 | 0.865 | | 6.14 |
| | 400 | | | 0.497 | 0.868 | | 6.87 |
| | 450 | | | 0.497 | 0.870 | | 7.62 |

(ii) Two-Dimensional Surface Heat Conduction—Abel Generalization

Figure 15:
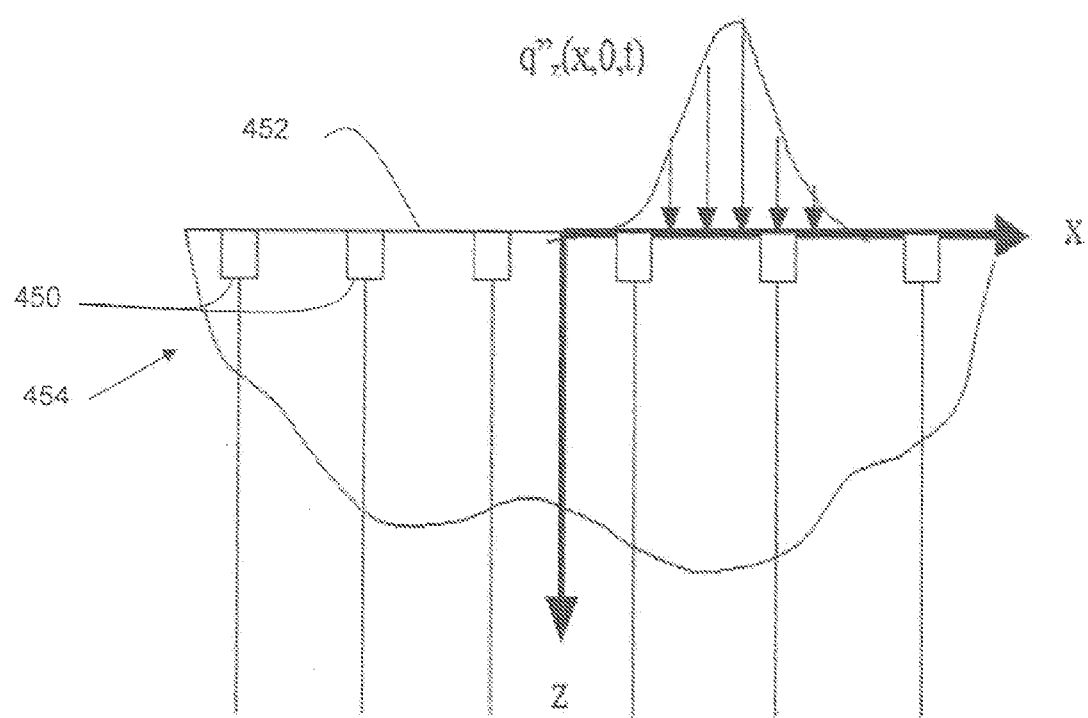
FIG. 15 depicts a coordinate system for two-dimensional surface heat conduction.

With reference to the surface sensor geometry depicted in FIG. 15 where surface sensors 450 are position on the surface 452 of a solid mass 454, consider $$\frac{\partial^2 T}{\partial x^2}(x, z, t) + \frac{\partial^2 T}{\partial z^2}(x, z, t) = \frac{1}{\alpha} \times \frac{\partial T}{\partial t}(x, z, t) \text{ for } x \in (-\infty, \infty),$$

$z \in (0, \infty)$ and $t > 0$ subject to the initial condition $T(x, 0, t) = T_0 = 0$, or $$T(x, 0, t) = \frac{1}{2\pi k} \int_{t_o=0}^{t} \int_{x_o=-\infty}^{\infty} q_z''(x_o, 0, t_o) \frac{e^{\frac{(x-x_o)^2}{4\alpha(t-t_o)}}}{t - t_o} dx_o dt_o,$$

$x \in (-\infty, \infty), t \geq 0$.

Heat flux in the x and z directions is then expressed as:

$$q_x''(x, z, t) = -k\frac{\partial T}{\partial x}(x, z, t) \text{ and } q_z''(x, z, t) = -k\frac{\partial T}{\partial z}(x, z, t).$$

After a lengthy but straightforward set of manipulations, the following integral relationship is obtained:

$$q_z''(x, 0, t) = \frac{1}{\lambda\pi} \int_{u=0}^{t} \frac{\partial T}{\partial u}(x, 0, u) \frac{du}{\sqrt{t-u}} -$$

$$\frac{1}{2\pi\sqrt{\alpha\pi}} \frac{\partial}{\partial t} \int_{u=0}^{t} \int_{x_o=-\infty}^{\infty} [q_z''(x_o, 0, u) -$$

$$q_z''(x, 0, u)] \frac{M(x, t/x_o, u)}{\sqrt{t-u}} dx_o dt_o,$$

$x \in (-\infty, \infty), t \geq 0$, where $M(x, t/x_o, u) =$ $$e^{-\frac{(x-x_o)^2}{8\alpha(t-u)}} K_0\left(\frac{(x-x_o)^2}{8\alpha(t-u)}\right) \text{ for } x_o \neq x,$$

where $K_0(z)$ is a modified Bessel function of order zero.

(iv) Inverse Heat Conduction (an Ill-Posed Problem):

(a) Theory and Background: The classical, linear inverse heat conduction problem (i.e. sideways) may be mathematically stated by heat equation $$\frac{1}{\alpha}\frac{\partial T}{\partial t}(x, t) = \frac{\partial^2 T}{\partial x^2}(x, t), x \in (0, L), t > 0, \quad (16a)$$

subject to the one-sided, discrete (with noise) temperature boundary condition $$T(0, t_i) = T_i, i = 1, 2, \ldots, M, \quad (16b)$$

and the adiabatic (for mere simplicity) boundary condition $$\frac{\partial T}{\partial x}(0, t) = 0, t > 0, \quad (16c)$$

and initial condition $$T(x, 0) = f(x), x \in [0, L], \quad (16d)$$

where $\alpha$ is the thermal diffusivity, L is the width of the slab, f(x) represents the initial condition in the slab and $T_i$ represent the measured temperature data. This problem is known to be highly ill-posed. A more suitable discrete data form for such a formulation should involve the direct measurement of dT/dt. This concept would control variability in the implicitly required derivative. The high frequency components would exist in the derivative which would be digitally filtered, functionally recast, and then integrated for inclusion in a well designed inverse heat conduction code.

Inverse heat conduction displays significant error magnification due to high frequency noise in the projection process. The amplification factor associated with a projection from the front face of a plate at x=0 to the back face at x=L can be derived with the aid of discrete Fourier transforms (DFTs). It can be shown that the error in the heat flux at any x in the frequency domain based on temperature data obtained from the front surface at x=0 behaves as $$\Delta \overline{q''}(x, \omega_n) = -k\overline{\epsilon}_0(0, \omega_n)\sqrt{\frac{j\omega_n}{\alpha}} \sinh\sqrt{\frac{j\omega_n}{\alpha}} x, \quad (17a)$$

$$n = 1, 2, \ldots, M$$

whereas the error in the heat flux at any x in the frequency domain based on heating/cooling rate data obtained from the front surface at x=0 behaves as $$\Delta \overline{q''}(x, \omega_n) = -\frac{k}{\alpha}\overline{\epsilon}_1(0, \omega_n)\frac{\sinh\sqrt{\frac{j\omega_n}{\alpha}} x}{\sqrt{\frac{j\omega_n}{\alpha}}}, \quad (17b)$$

$$n = 1, 2, \ldots, M,$$

where the bar notation represents the discrete Fourier transform of the function or data; k, α are the thermal conductivity and thermal diffusivity, respectively; the ϵ's are the local noise values for each data set ($\epsilon_0$—temperature, $\epsilon_1$—heating/cooling rate), $j=(-1)^{1/2}$, $\omega_n 2\pi f_n$, $f_n = n/t_{max}$ and where $t_{max}$ is the experiment time duration. The embedded amplification factors indicate that the data form (dT/dt) will provide significant assistance to inverse problems.

(b) Example: To illustrate how inverse heat conduction problem can be drastically simplified with the aid of the rate sensor of the present invention, we now consider the one-sided heat equation previously described, however, the one-sided conditions are imposed at x=L (instead of x=0). The front surface is subjected to a step in heat flux at t=0 while the back surface is insulated. The heating/cooling rate sensor is located at the back surface. The entire inverse heat conduction code is based on a space matching scheme, namely:

$$T^p_{j+1} = T^p_j + \frac{\Delta x}{k} q^p_j$$

$$q^p_{j+1} = q^p_j + \frac{k\Delta x}{2\alpha \Delta t}\left(T^{p+1}_j - T^{p-1}_j\right), \quad p = 1, 2, \ldots P - 1,$$

$$T^P_{j+1} = 2T^{P-1}_{j+1} - T^{P-2}_{j+1}$$

$$q^P_{j+1} = 2q^{P-1}_{j+1} - q^{P-2}_{j+1}, \quad j = 0, 1, \ldots, N_x - 1$$

where Δx and Δt are the spatial and temporal uniform node spacings, respectively. The majority of the work now lies in the analysis of the data with very little work involved in the inverse heat conduction code. The inclusion of temperature dependent thermal properties is trivial. Some temporal mappings are required as pre- and post-padding is used for the discrete Fourier transform analysis.

Figure 16A:
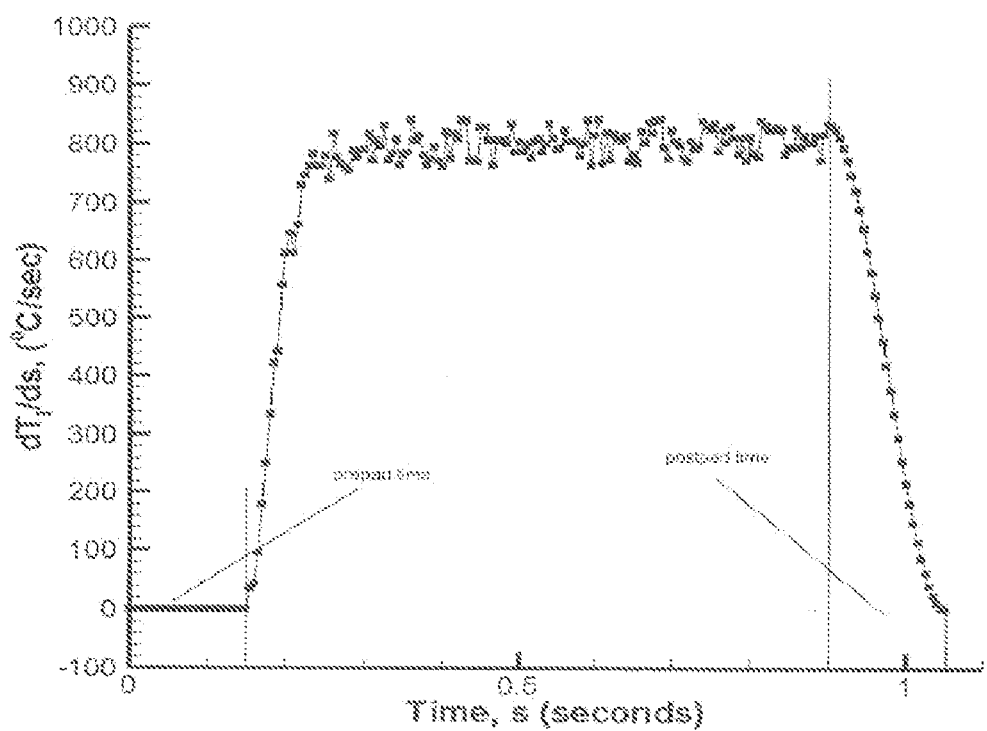
FIG. 16A depicts simulated heating/cooling rate data (dT/dt) with pre and post padding.
Figure 16B:
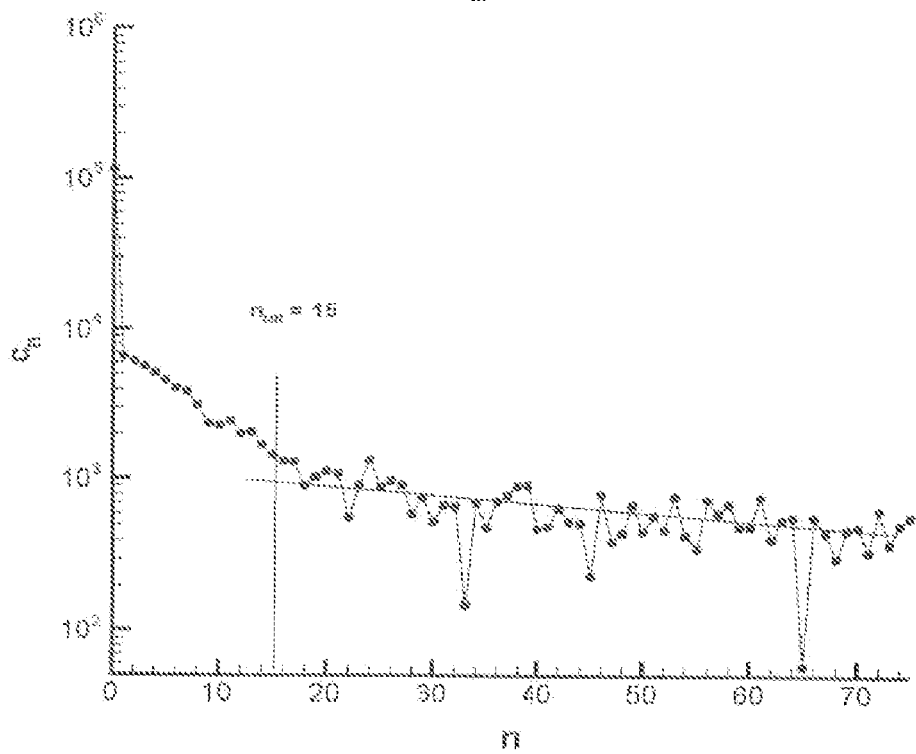
FIG. 16B depicts the corresponding frequency spectral data from the measured data of FIG. 16A.

FIG. 16A shows the simulated heating/cooling rate data (dT/dt) at the back surface with pre and post padding. The padding ranges are used for the discrete Fourier transform analysis. Five (5) percent error is introduced based on the maximum heat flux. FIG. 16B presents the resulting power spectra of the simulated data. This induced noise is based on random (white) noise from a uniform probability density function in the range of [−1,1] where L=0.5 cm, α=1 cm²/s, k=2.5W/(cm K), q*$_s$=1000 W/cm².

Figure 16C:
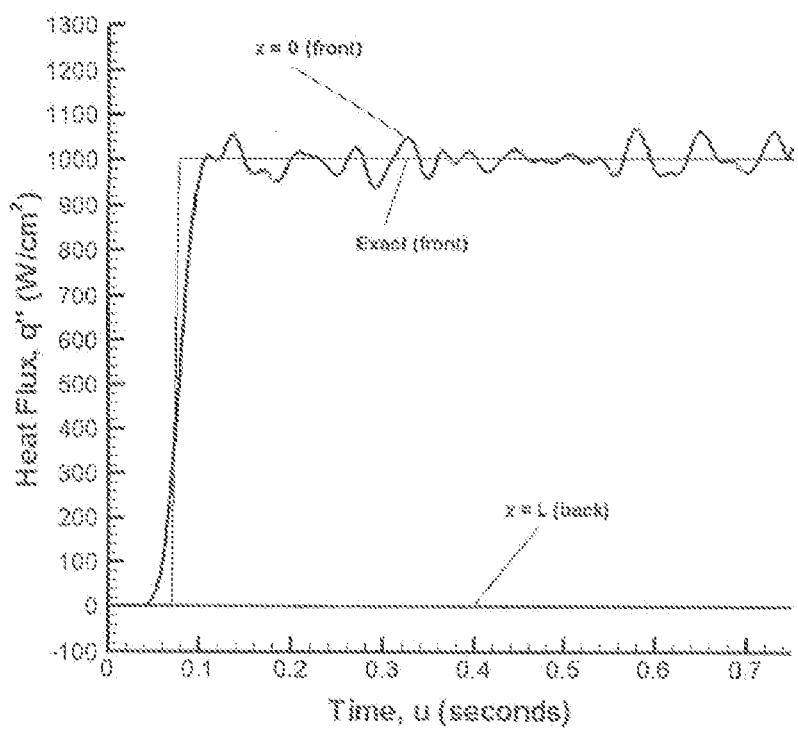
FIGS. 16C and 16D depict converged numerical results for surface heat flux.
Figure 16D:
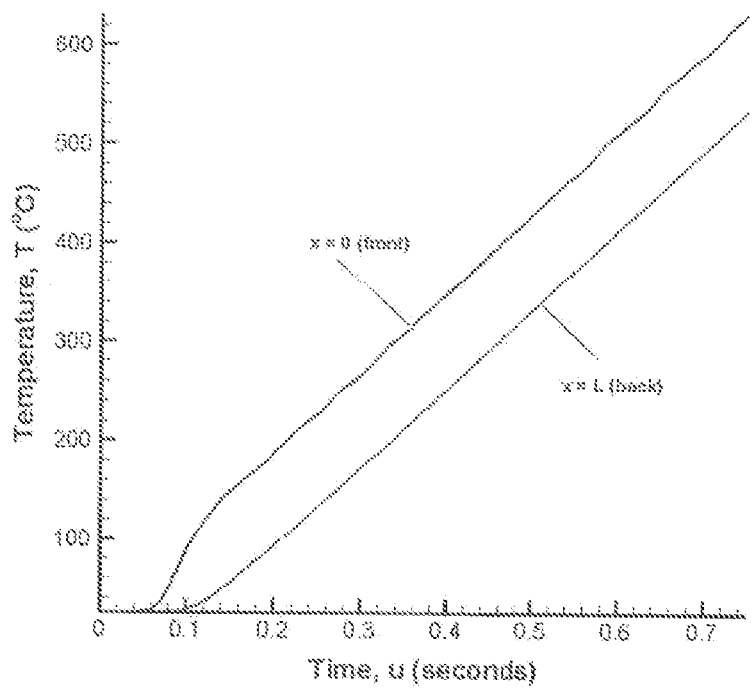

FIGS. 16C and 16D display the converged numerical results for the surface heat flux and temperatures at x=0 and x=L with an input error of 5%. Note the high degree of accuracy (within 5%). Temperature data with 5% error would not recover such accurate predictions, even if one could devise the optimal regularization parameter. Pre-padding of data also removes Gibbs-type issues.

(iii) Real-Time Inverse Heat Conduction:

A broader and very practical inverse heat conduction example is now presented illustrating the importance and implications of rate-based transducers for real-time health management systems. Inverse heat conduction is an important area in fire and aerospace sciences, heat treatment and other areas. This example addresses the question, "What are the most suitable transient sensors for resolving inverse heat conduction problems in a real-time basis?" The approach taken here is based on analytic continuation (Taylor series). Again consideration is directed toward a half-space geometry where 0<x<∞. Here, x=η defines the probe location. It can be demonstrated, via Taylor series, that the surface temperature can be estimated (for the moment without consideration to the penetration time, i.e., multidimensional Taylor expansion) by $$T(0, t) = T(\eta, t) + q''(\eta, t)\frac{\eta}{1!k} + \frac{\partial T}{\partial t}(\eta, t) \quad (18)$$

$$\frac{\eta^2}{2!\alpha} + \frac{\partial q''}{\partial t}(\eta, t)\frac{\eta^3}{3!\alpha k} + \frac{\partial^2 T}{\partial t^2}(\eta, t)\frac{\eta^4}{4!\alpha^2} + \ldots$$

Equation (18) encourages the measurement of T(η,t), q"(η,t) and their temporal derivatives. It should be noted that a similar Taylor series can be developed for heat flux q"(0,t) based on measured rate quantities at x=η. In this case, one obtains $$q''(0, t) = q''(\eta, t) + \frac{k}{\alpha}\frac{\partial T}{\partial t}(\eta, t)\frac{\eta}{1!} + \frac{1}{\alpha}\frac{\partial q''}{\partial t}(\eta, t) \quad (19)$$

$$\frac{\eta^2}{2!} + \frac{k}{\alpha^2}\frac{\partial^2 T}{\partial t^2}(\eta, t)\frac{\eta^3}{3!} + \frac{1}{\alpha^2}\frac{\partial^2 q''}{\partial t^2}(\eta, t)\frac{\eta^4}{4!} + \ldots$$

It is well known that the accurate depiction of heat flux in inverse heat conduction is much more difficult than the recovery of the temperature.

Figure 17A:
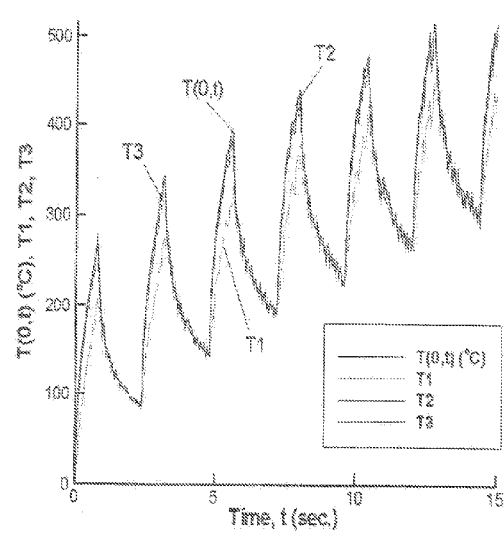
FIGS. 17A and 17B depict reconstructed surface temperature and heat flux using simulated data containing white noise.
Figure 17B:
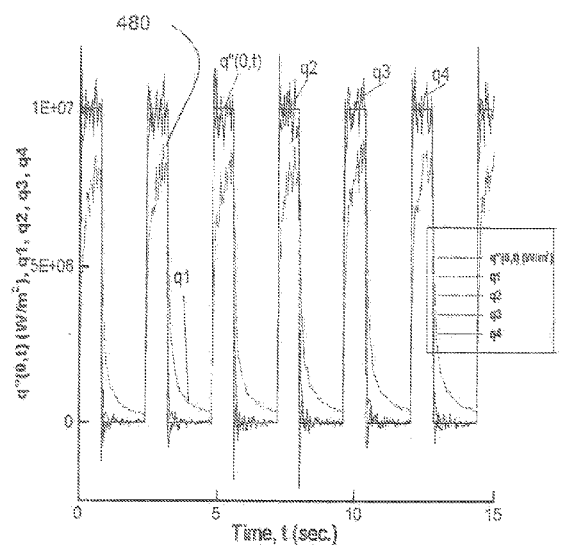

FIGS. 17A and 17B present the reconstructed surface temperature and heat flux (Taylor approximation) in a copper body using simulated data containing white noise. (Copper: α=117×10⁻⁶ m²/s, k=401 W/(m° C.), $T_o$=0° C., η=0.3175 cm.) For this simulation, the noise levels increase for each probe in the series, $\omega_1$=0.05 (j=1,T) and $\omega_j$=2$\omega_{j-1}$,j=2,3,4,5; (j=2, q"), (j=3, dT/dt), (j=4, dq"/dt), (j=5, d²T/dt²). Here, ω is a noise factor. That is, it is assumed that the error increases in the sensor for each derivative and that more error is present in the flux measurement than temperature measurement. In FIG. 17B, the exact (errorless) input is represented by the square pulse 480. The error is clearly additive and thus the projection is stable. Only a few terms are required to reconstruct the desired surface condition. The accuracy of the projection increases as additional terms are included. It should be noted that a significant local error is introduced into the higher-order sensors (Taylor terms). For copper, these terms are not significant. The actual error decomposition leads to local errors in the measurement sensor and the truncation error of the Taylor series. For FIG. 17A, T1=1 term, T2=2 terms, ..., in Eq. (18) while for FIG. 17B, q1=1 term, q2=2 terms, ... in Eq. (19).

These figures demonstrate the concept of accuracy and stability in the sensor solution provided by the present invention. This concept overcomes the computational difficulties associated with inverse heat conduction based on numerical methods involving regularization (such as Future Information Method, Tikhonov Regularization, spacing marching finite differences, etc.). Additionally, Equations (18) and (19) indicate potential real-time predictions that can be utilized in health monitoring applications.

Two heat transfer tests are proposed for validation and implementation purposes. These tests involve a benchmark heat transfer cell for acquiring desired heating rate, dT/dt, and a benchmark 1-D transient inverse heat conduction test setup.

(a) Heating Rate Test: The objective of the benchmark heating rate experimental setup is to conceive an experiment where heating rate dT/dt and temperature T(t) are accurately measured. In order to achieve the stated objective, the concept of lumped thermal capacitance is utilized. Lumped thermal capacitance is applicable when a dimensionless number called Biot number (Bi) is less than 0.1. Biot number represents the ratio of internal thermal resistance for heat flow through the solid object by conduction to external thermal resistance for heat flow out of the object. In this experiment setup $Bi<10^{-5}$ is achieved which is well below the accepted value of 0.1.

The heated object in the experiment is a cylindrical rod made of reaction bonded Silicon Carbide. Based on thermal, electrical and physical properties of Silicon Carbide, a rod with a diameter of 1.5-cm and length of 3-cm is selected for resistive heating. Certain thermal, electrical and physical properties of silicon carbide are listed in Table 3. The electrical resistance of the rod is calculated to be in the range of 170-200 Ohms. Calculations indicate that heating rates as high as 20° C./s may be achieved.

TABLE 3

| Specific Heat (J/kg-K @25° C.) | Thermal Conductivity (W/m-K @20° C.) | Density (Kg/m$^3$) | Volume Resistivity (Ohm-cm @25° C.) |
|---|---|---|---|
| 1100 | 150-200 | 3100 | 100 |

The temperature of the rod is measured via a surface mounted fast response (order of milliseconds) type K thermocouple. The thermocouple is made from 0.013 mm thermocouple alloy foil by a special process where the butt-welded thermocouple junction is 0.013 mm in thickness. The foil sensor is embedded between two paper-thin, glass reinforced high temperature polymer laminates that support and electrically insulate the foil section as well as provide a flat surface for cementing.

A heated cylindrical silicon carbide rod is insulated via flexible Aerogel insulation blanket. The thermal conductivity of the Aerogel insulation blanket is about 0.015 W/m-K which is less than the thermal conductivity of air. Calculations indicate that an insulation thickness of 25 mm is sufficient to reduce the heat loss from the heated rod to less than 0.7% of the power input.

Figure 18:
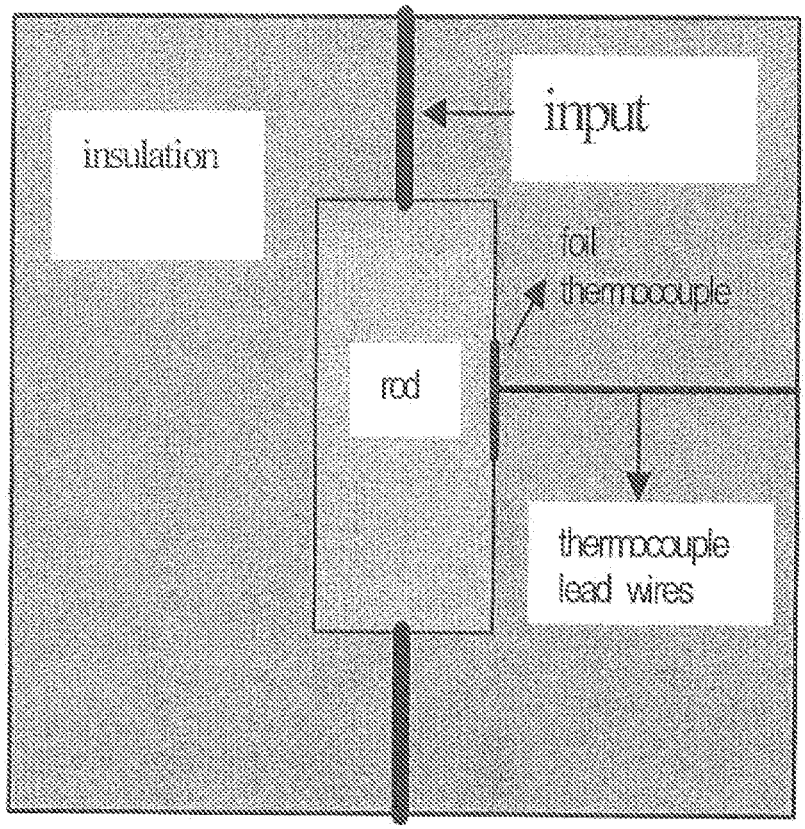
FIGS. 18 and 19 depict somewhat schematic cross-sectional views of a heating rate test setup.

FIG. 18 shows a cross-sectional view of the heating rate test setup. The temporal values of the voltage and current inputs to the heated rod are measured to ensure that an accurate power input is determined. The temporal values of the voltage output of the foil thermocouple are measured and stored for further analysis. The heating rate is calculated via, $dT/dt=P/C_t$, where P is the power input and $C_t$ is thermal capacitance of the rod, i.e, the product of the mass of the rod and its specific heat.

(b) Benchmark Inverse Heat Conduction Test Setup: Conceptually, an experiment may be conducted where the imposed heat flux may be accurately predicted based on the thermocouple data and their corresponding heating rate data obtained from the heating rate sensor of the present invention.

Accuracy Considerations. Accuracy of the measured variables encompasses several factors. For example, a measured temperature history may be subject to errors due to bias, uncertainty, response time, and error in perceived location of the probe. With careful calibration, proper placement of the probe (along isotherm), and sensitive measuring devices one can eliminate the bias and minimize the uncertainty. The time constant may be determined in situ by several methods, and the preferred method is described below. The relative importance of the uncertainty in time assignment to a measurement, even after correction for response time, depends on the "rapidness of the transient" versus the frequency of the data collection. With careful selection of the test medium, the temporal nature of the induced boundary conditions, and the speed of the data acquisition system, the uncertainty in time assignment to the measured values can be minimized. The uncertainty in the space assignment to a measured temperature is often ignored (not even mentioned). Depending on the test medium and the phenomenon under study, even 0.1-mm uncertainty in the space assignment may lead to significant error.

Experimental Setup. The symmetry concept is utilized to ensure an accurate accounting of the imposed heat flux. Also by taking advantage of symmetric heating of identical samples, thermocouple sensors can be spaced further apart and avoid "crowding" and disturbing the test medium. The test assembly consists of two identical stainless steel plates with a square cross-section 10-cm long on each side and a thickness of 1.25-cm with a 0.3-mm Kapton foil heater (www.minco.com) placed at their interface.

The heated plates are insulated via flexible Aerogel insulation blanket (www.aerogel.com). The thermal conductivity of the Aerogel insulation blanket is about 0.015 W/m-K which is less than the thermal conductivity of air. Based on preliminary calculations, an insulation thickness of 25 mm is sufficient to reduce the heat loss to less than 0.7% of the power input. The temporal values of the voltage and current inputs to the foil heater are measured to ensure an accurate power input is determined. This is for validating transient fluxes from $\dot{T}$ measurement of the thermocouple between the heater and the test sample.

Figure 19:
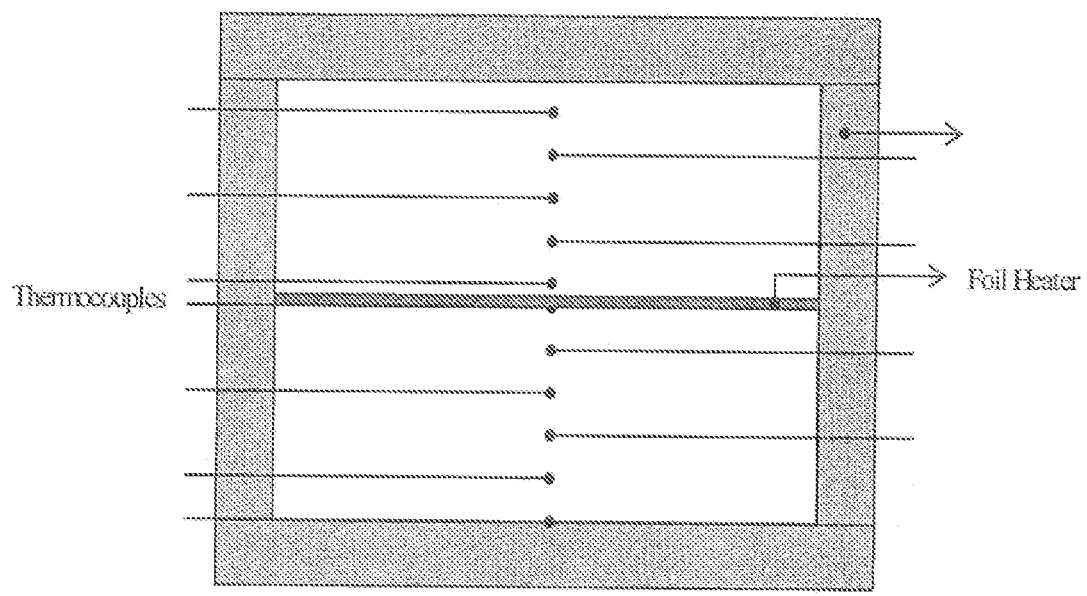

FIG. 19 shows a cross-sectional view of the heating rate test setup. The temperature of the top and bottom surfaces of one test specimen are measured via surface mounted fast response (order of milliseconds) type T thermocouples. A special manufacturing process makes the thermocouple foil such that the butt-welded junction is 0.013 mm in thickness. The foil sensor is embedded between two paper-thin, glass reinforced high temperature polymer laminates that support and electrically insulate the foil section as well as provide a flat surface for cementing (www.omega.com). Nine stainless steel thermocouple probes with a diameter of 0.51 mm are inserted through 0.6-mm holes drilled in the test samples to monitor the temperature in the test domain. The probes are parallel to isotherms, and their tips are located along the centerline of the test section. These thermocouples are distributed within the two samples, and secured in the holes via Omega CC high temperature cement. This arrangement produces temperature data in 1-mm increments from the heated surface.

In order to minimize the uncertainty in the temperature data the following procedure is implemented.

Eliminate error due to axial conduction by placing the probes parallel to isotherms.

The measurement bias is determined and corrected for via repeated steady state measurements at room temperature and comparison with a precision thermometer calibrated by the National Bureau of Standards. Measurement accuracy is also established through comparison with the precision thermometer calibrated by the National Bureau of Standards.

To determine the precise effective sensing location of each probe, several steady state conduction experiments are conducted by varying the temperature drop across the test specimen (for these tests the insulation at the horizontal surfaces are removed). The measured probe temperatures should conform to a linear temperature drop between the isothermal surfaces. Thus the precise location of the probe tips is determined.

The response time of the thermocouples is measured by an in-situ test called Loop Current Step Response, LCSR. In a steady state condition, current is applied to the thermocouple for a short period of time and thus the sensor is driven slightly out of equilibrium with its surroundings. Analysis of the recovery signal of the sensor from this perturbation reveals the in-situ response time.

In summary, the various embodiments of the universal rate-based sensor described herein permit real-time analysis of many physical problems. The approach applied permits use of existing, customer-convenient and established sensors in a non-intrusive manner. This universal sensor interface does not require the customer to invest additional support into technician training nor does it require the removal of existing sensors on sensitive platforms. Thus, the existing sensor platform is transparent to the present development, which extends the usefulness of the established sensors.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated.

What is claimed is:

1. A method for determining a rate of change of a physical or environmental parameter $\Phi$ at a time t, the method comprising the steps of:

(a) sensing a voltage rate dV/dt representative of the rate of change of the physical or environmental parameter $\Phi$ at the time t using a sensor that is operable to detect variations in the physical or environmental parameter $\Phi$;

(b) determining a calibration factor d$\Phi$/dV which relates an incremental change in the physical or environmental parameter $\Phi$ to a corresponding incremental change in voltage V;

(c) multiplying the voltage rate dV/dt by the calibration factor d$\Phi$/dV to determine the rate of change d$\Phi$/dt of the physical or environmental parameter $\Phi$ at the time t; and (d) using an information processor to store data representing one or both of the voltage rate dV/dt and the rate of change d$\Phi$/dt of the physical or environmental parameter $\Phi$.

2. The method of claim 1 further comprising a step of sensing the voltage V representative of the physical or environmental parameter $\Phi$ at the time t, and wherein step (b) comprises determining the calibration factor d$\Phi$/dV as a function of the voltage V at the time t.

3. The method of claim 1 wherein the sensor comprises:

an input impedance circuit configured to sense the input voltage, the input impedance circuit having an input resistor with resistance $R_1$ and an input capacitor with a capacitance $C_1$ in series with the input resistor;

an operational amplifier electronically coupled to the input impedance circuit; and a feedback impedance circuit across the operational amplifier, the feedback impedance circuit having a feedback resistor with a resistance $R_2$ and a feedback capacitor with a capacitance $C_2$ in parallel with the feedback resistor.

4. The method of claim 1 wherein the sensor comprises:

an electronic differentiator circuit having: a modulation circuit configured to up-convert the signal spectra F(t) by a carrier frequency $\omega_m$ and provide an up-converted signal;

a differentiation circuit configured to differentiate the up-converted signal to provide a first signal component $-F'(t) \cdot e^{j\omega t}$ and a second signal component $-j\omega \cdot F(t) \cdot e^{j\omega t}$;

a phase shift circuit configured to shift the up-converted signal 90° at $\omega_m$ to produce a phase-shifted signal $j\omega t \cdot F(t) e^{j\omega t}$;

a summing circuit configured to add the first signal component, the second signal component and the phase-shifted signal to produce a carrier signal $-F'(t) \cdot e^{j\omega t}$; and a demodulation circuit configured to extract a time derivative signal $-F'(t)$ from the carrier signal.

5. An electronic differentiator circuit comprising:

an input impedance circuit configured to sense an input voltage $e_1$ having an amplitude p and a frequency f the input impedance circuit comprising an input resistor with resistance $R_1$ and an input capacitor with a capacitance $C_1$ in series with the input resistor;

an operational amplifier electronically coupled to the input impedance circuit; and a feedback impedance circuit across the operational amplifier, the feedback impedance circuit comprising a feedback resistor with a resistance $R_2$ and a feedback capacitor with a capacitance $C_2$ in parallel with the feedback resistor.

6. The electronic differentiator circuit of claim 5 wherein $R_1 \times C_1$ is substantially equal to $R_2 \times C_2$.

7. The electronic differentiator circuit of claim 5 wherein $C_2 < C_1$ and $R_1 < R_2$.

8. The electronic differentiator circuit of claim 5 wherein $f^2 \times \tau^2 < 1/(4\pi^2)$ and $p \times f^2 \times \tau \times R_2 \times C_1 < 1/(8\pi^2)$ 9. The electronic differentiator circuit of claim 5 wherein the gain of the operational amplifier is set by a single resistor.

10. An electronic differentiator circuit comprising:

a modulation circuit configured to receive an input voltage $e_i$ having a signal spectra F(t), up-convert the signal spectra F(t) by a carrier frequency $\omega_m$ and provide an up-converted signal;

a differentiation circuit configured to differentiate the up-converted signal to provide a first signal component $-F'(t) \cdot e^{j\omega t}$ and a second signal component $-j\omega \cdot F(t) \cdot e^{j\omega t}$;

a phase shift circuit configured to shift the up-converted signal 90° at $\omega_m$ to produce a phase-shifted signal $j\omega t \cdot F(t) \cdot e^{j\omega t}$;

a summing circuit configured to add the first signal component, the second signal component and the phase-shifted signal to produce a carrier signal $-F'(t) \cdot e^{j\omega t}$; and a demodulation circuit configured to extract a time derivative signal $-F'(t)$ from the carrier signal 11. A method for determining a rate of change of a physical or environmental parameter $\Phi$ at a time t, the method comprising the steps of:

(a) sensing a voltage rate dV/dt representative of the rate of change of the physical or environmental parameter $\Phi$ at the time t using a sensor that is operable to detect variations in the physical or environmental parameter $\Phi$;

(b) determining a calibration factor $d\Phi/dV$ which relates an incremental change in the physical or environmental parameter $\Phi$ to a corresponding incremental change in voltage V;

(c) multiplying the voltage rate dV/dt by the calibration factor $d\Phi/dV$ to determine the rate of change $d\Phi/dt$ of the physical or environmental parameter $\Phi$ at the time t; and (d) displaying data on a display device representing one or both of the voltage rate dV/dt and the rate of change $d\Phi/dt$ of the physical or environmental parameter $\Phi$.

* * * * *